(12) United States Patent
Sakoda et al.

(10) Patent No.: US 10,091,720 B2
(45) Date of Patent: Oct. 2, 2018

(54) CONNECTING WIRELESS COMMUNICATION APPARATUSES IN A WIRELESS NETWORK BASED ON A USER INPUT

(71) Applicant: SONY CORPORATION, Tokyo (JP)

(72) Inventors: Kazuyuki Sakoda, Chiba (JP); Yoichiro Sako, Tokyo (JP); Katsuhisa Aratani, Kanagawa (JP); Kohei Asada, Kanagawa (JP); Kazuhiro Watanabe, Tokyo (JP); Takatoshi Nakamura, Kanagawa (JP); Mitsuru Takehara, Tokyo (JP); Yuki Koga, Tokyo (JP); Hiroyuki Hanaya, Kanagawa (JP); Tomoya Onuma, Shizuoka (JP); Akira Tange, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 14/654,415

(22) PCT Filed: Oct. 1, 2013

(86) PCT No.: PCT/JP2013/076674
§ 371 (c)(1),
(2) Date: Jun. 19, 2015

(87) PCT Pub. No.: WO2014/103456
PCT Pub. Date: Jul. 3, 2014

(65) Prior Publication Data
US 2015/0351022 A1    Dec. 3, 2015

(30) Foreign Application Priority Data

Dec. 26, 2012 (JP) ................................ 2012-282305

(51) Int. Cl.
*H04W 48/18* (2009.01)
*H04W 8/00* (2009.01)
(Continued)

(52) U.S. Cl.
CPC .......... *H04W 48/18* (2013.01); *H04W 8/005* (2013.01); *H04W 84/18* (2013.01); *H04W 88/06* (2013.01)

(58) Field of Classification Search
None
See application file for complete search history.

(56) References Cited

U.S. PATENT DOCUMENTS

2003/0069921 A1\* 4/2003 Lamming ......... G06F 17/30905
709/203
2005/0254472 A1\* 11/2005 Roh ...................... H04L 45/00
370/338

(Continued)

FOREIGN PATENT DOCUMENTS

JP   2009-239385 A   10/2009
JP   2012-216887 A   11/2012

OTHER PUBLICATIONS

Shinji Motegi et al. "Proposal of Service Discovery for Wireless Ad Hoc Networks." vol. 43, No. 12, IPSJ Journal, Dec. 2002.

*Primary Examiner* — Adnan Baig
(74) *Attorney, Agent, or Firm* — Chip Law Group

(57) ABSTRACT

Provided is a wireless communication apparatus including a communication unit that transmits and receives data in at least one communication mode from among a first communication mode in which wireless communication is conducted with other wireless communication apparatuses present within a predetermined range, and a second communication mode in which wireless communication is conducted with other wireless communication apparatuses present within a wider range than the predetermined range;

(Continued)

and a control unit that, when data is being transmitted and received with a second wireless communication apparatus via one or a plurality of other wireless communication apparatuses in the first communication mode, configures the second communication mode and conducts a control for detecting a third wireless communication apparatus that satisfies a predetermined condition.

12 Claims, 12 Drawing Sheets

(51) Int. Cl.
*H04W 84/18* (2009.01)
*H04W 88/06* (2009.01)

(56) References Cited

U.S. PATENT DOCUMENTS

2009/0319663 A1* 12/2009 Giles .................... H04W 8/183
709/226
2010/0081381 A1* 4/2010 Rofougaran ............ H04B 7/12
455/41.2

\* cited by examiner

FIG. 3

| FIRST COMMUNICATION MODE 225 | SECOND COMMUNICATION MODE 226 |
|---|---|
| MILLIMETER WAVE COMMUNICATION (60GHz ETC.) | 2.4GHz WIRELESS LAN |
| 5GHz WIRELESS LAN | 900MHz LOW-POWER WIRELESS |
| 5GHz WIRELESS LAN | Super Wi-Fi |
| 5GHz WIRELESS LAN | 3G OR LTE (MOBILE PHONE) |
| UWB (Ultra Wide Band) | 2.4GHz WIRELESS LAN |
| VISIBLE LIGHT COMMUNICATION | 5GHz WIRELESS LAN |
| NFC (Near Field Communication) | 2.4GHz WIRELESS LAN |

FIG. 5
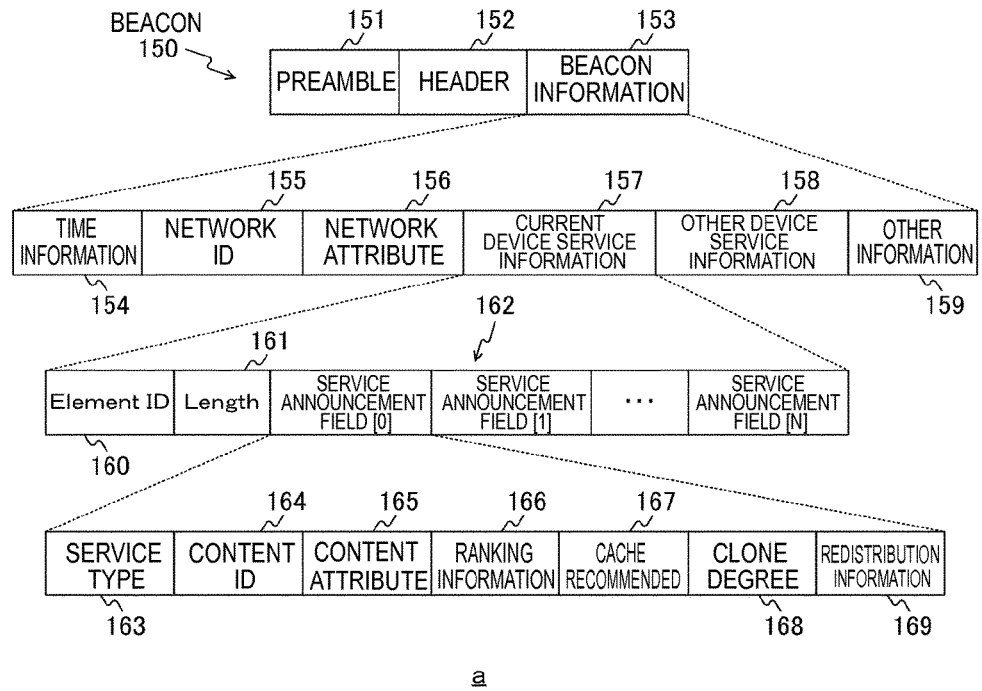
a
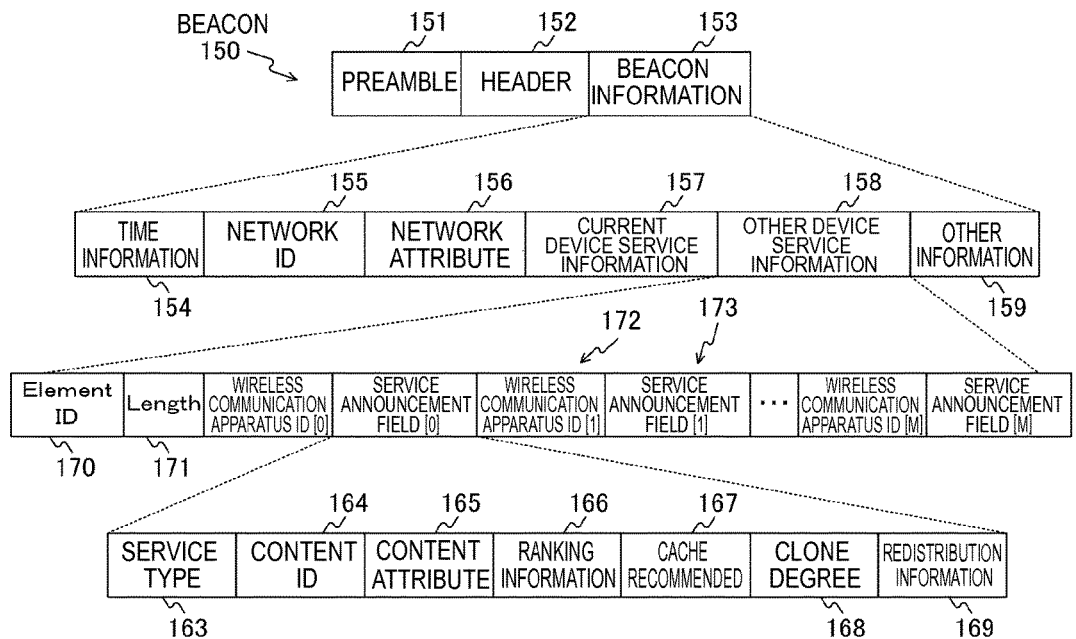
b

FIG. 6

| | | |
|---|---|---|
| 163 | SERVICE TYPE | INFORMATION FOR IDENTIFYING SERVICE DETAILS (SUCH AS CONTENT DELIVERY). MAY ALSO INCLUDE COUNT INDICATING HOW MANY MORE TIMES SERVICE DISCOVERY INFORMATION MAY BE FORWARDED. ON BASIS OF SERVICE TYPE, WIRELESS COMMUNICATION APPARATUS THAT RECEIVES SERVICE DISCOVERY INFORMATION MAY DECIDE WHETHER OR NOT TO RECEIVE SERVICE IDENTIFIED BY SERVICE TYPE. |
| 164 | CONTENT ID | ID FOR IDENTIFYING SERVICE. WIRELESS COMMUNICATION APPARATUS THAT TRANSMITS OR RECEIVES SERVICE DISCOVERY INFORMATION MANAGES RECEIVING OF SERVICE IDENTIFIED BY CONTENT ID ON BASIS OF CONTENT ID, AND GENERATES FEE INFORMATION ETC. AS REQUIRED. |
| 165 | CONTENT ATTRIBUTE | INFORMATION THAT INDICATES BIT CAPACITY REQUIRED TO PROVIDE SERVICE, GROUP ABLE TO RECEIVE SERVICE, AUTHENTICATION METHOD REQUIRED TO RECEIVE SERVICE, ETC. WIRELESS COMMUNICATION APPARATUS THAT RECEIVES SERVICE DISCOVERY INFORMATION MAY DECIDE, ON BASIS OF CONTENT ATTRIBUTE, WHETHER OR NOT TO RECEIVE CORRESPONDING SERVICE, OR WHETHER OR NOT CORRESPONDING SERVICE IS RECEIVABLE. |
| 166 | RANKING INFORMATION | INFORMATION THAT INDICATES WHETHER FREQUENCY OF ACCESS TO SERVICE (CONTENT) IS HIGH OR LOW. WIRELESS COMMUNICATION APPARATUS THAT TRANSMITS SERVICE DISCOVERY INFORMATION MAY DECIDE, ON BASIS OF RANKING INFORMATION, WHETHER OR NOT TO ANNOUNCE SERVICE DISCOVERY INFORMATION TO NEXT WIRELESS COMMUNICATION APPARATUS, OR HOW FREQUENTLY TO ANNOUNCE SERVICE DISCOVERY INFORMATION. WIRELESS COMMUNICATION APPARATUS THAT RECEIVES SERVICE DISCOVERY INFORMATION MAY DECIDE, ON BASIS OF RANKING INFORMATION, WHETHER OR NOT TO CACHE RECEIVED CONTENT. |
| 167 | CACHE RECOMMENDATION | INFORMATION THAT INDICATES RECOMMENDATION OF HOW MUCH SERVICE SHOULD BE CACHED FOR NEIGHBORING WIRELESS COMMUNICATION APPARATUSES (RECOMMENDED DEGREE). WIRELESS COMMUNICATION APPARATUS THAT TRANSMITS SERVICE DISCOVERY INFORMATION CONFIGURES SETTING THAT RAISES RECOMMENDED DEGREE IN CASE OF JUDGING THAT SERVICE IS ACCESSED FREQUENTLY AND SERVICE SHOULD BE PROVIDED TO OTHER WIRELESS COMMUNICATION APPARATUSES. ALSO, WIRELESS COMMUNICATION APPARATUS THAT RECEIVES SERVICE DISCOVERY INFORMATION MAY DECIDE, ON BASIS OF CACHE RECOMMENDATION, WHETHER OR NOT TO RECEIVE AND CACHE CONTENT. |
| 168 | CLONE DEGREE | INFORMATION THAT INDICATES HOW MANY TIMES SERVICE (CONTENT) HAS BEEN COPIED FROM ORIGINAL, OR ALTERNATIVELY, HOW MANY MORE TIMES COPYING IS ALLOWED. WIRELESS COMMUNICATION APPARATUS THAT RECEIVES SERVICE DISCOVERY INFORMATION IS CONTROLLED TO BE UNABLE TO STORE COPY EQUAL TO OR GREATER THAN COUNT DETERMINED BY CLONE DEGREE. |
| 169 | REDISTRIBUTION INFORMATION | INFORMATION THAT INDICATES WHETHER OR NOT WIRELESS COMMUNICATION APPARATUS THAT RECEIVES SERVICE DISCOVERY INFORMATION MAY CACHE AND REDISTRIBUTE SERVICE (CONTENT). IN WIRELESS COMMUNICATION APPARATUS THAT RECEIVES SERVICE DISCOVERY INFORMATION, NEED TO CACHE AND REDISTRIBUTE SERVICE (CONTENT) IS CONTROLLED ON BASIS OF REDISTRIBUTION INFORMATION. |

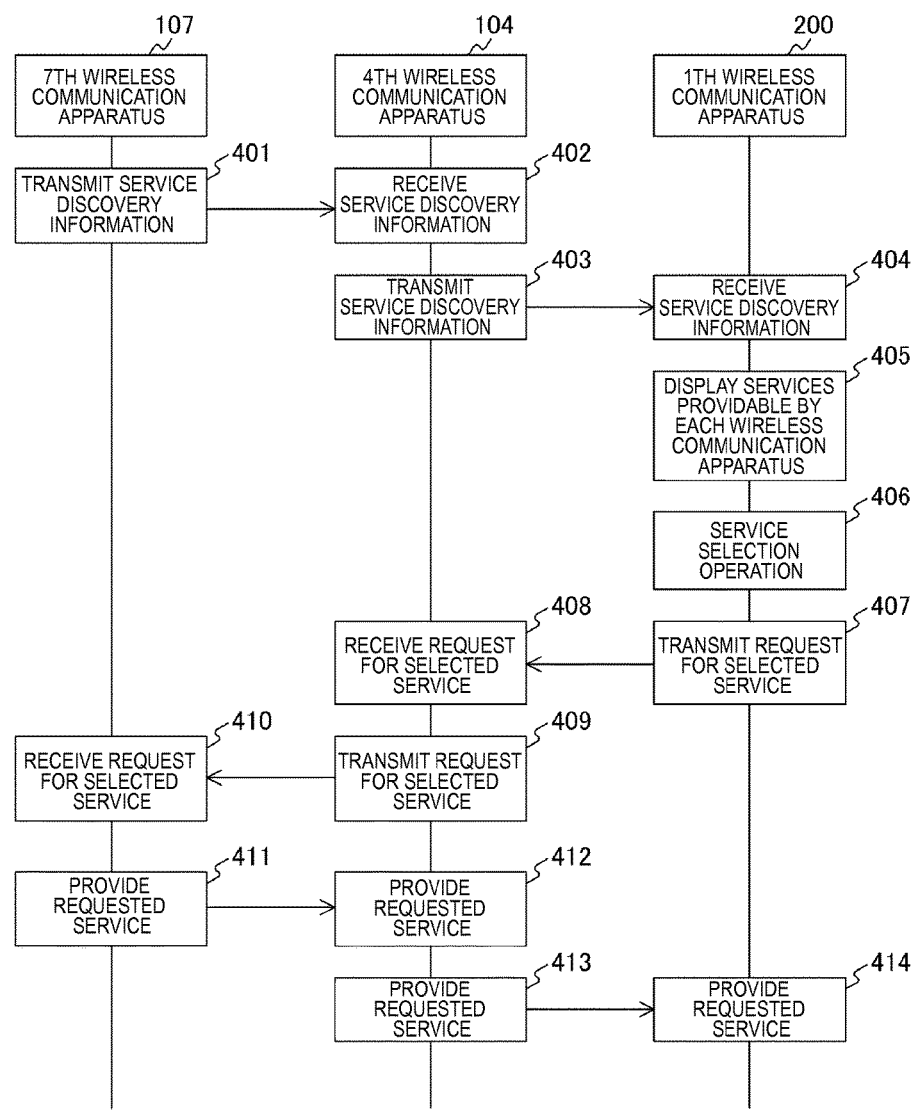

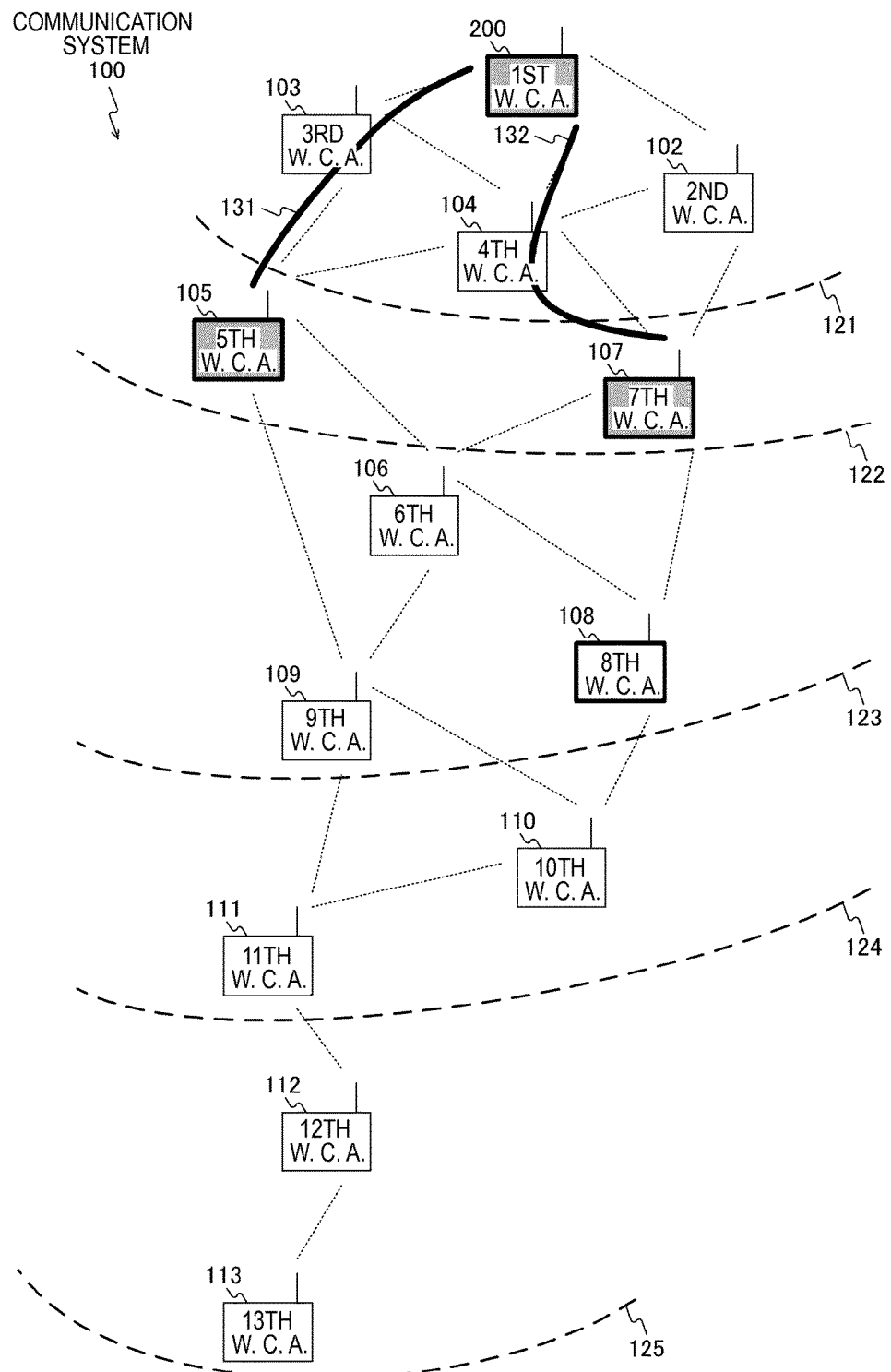

NOW EXECUTING OPTIMIZATION PROCESS USING WIRELESS COMMUNICATION IN SECOND COMMUNICATION MODE.
YOU CAN STILL CONTINUE TO RECEIVE SERVICES USING WIRELESS COMMUNICATION IN THE FIRST COMMUNICATION MODE.

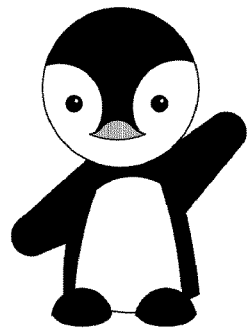

311

CANCEL a

320

THE FOLLOWING SERVICE PROVIDER(S) WERE CHANGED BY THE OPTIMIZATION PROCESS USING WIRELESS COMMUNICATION IN THE SECOND COMMUNICATION MODE.

321 → SERVICE   322 → PROVIDER   323 → COMMUNICATION PREDICTION

AUDIO SERVICE
(MUSIC CONTENT)

5TH WIRELESS COMMUNICATION APPARATUS
↓
8TH WIRELESS COMMUNICATION APPARATUS

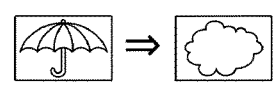

324

OK b

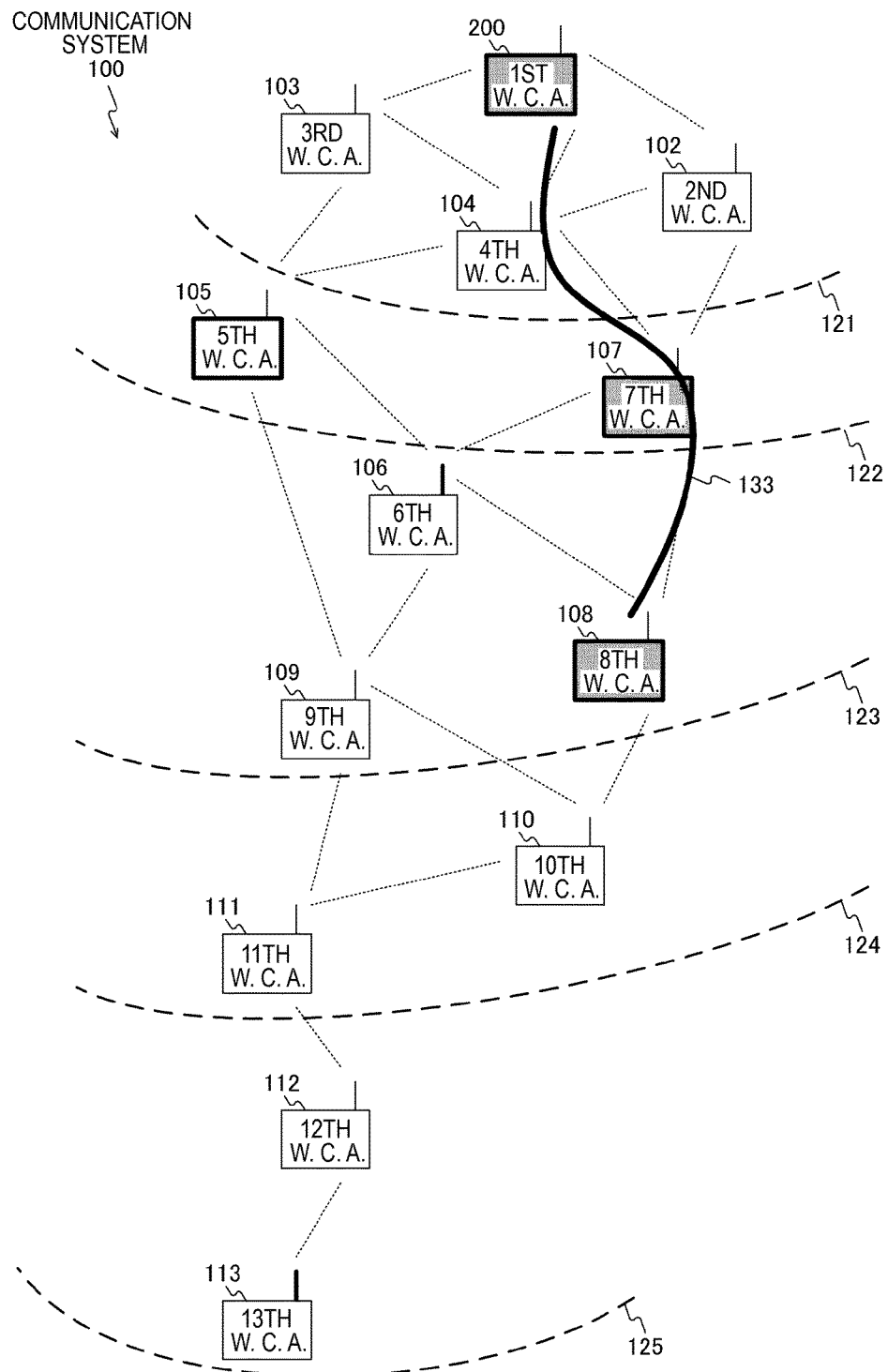

CONNECTING WIRELESS COMMUNICATION APPARATUSES IN A WIRELESS NETWORK BASED ON A USER INPUT

TECHNICAL FIELD

The present technology relates to a wireless communication apparatus, and more particularly relates to a wireless communication apparatus that transmits and receives data with another wireless communication apparatus using wireless communication, a communication system, a wireless communication apparatus control method, and a program causing a computer to execute the method.

BACKGROUND ART

In the related art, there exists wireless communication technology in which various data is exchanged using wireless communication. For example, a communication method in which nearby wireless communication apparatuses autonomously interconnect (by ad hoc communication or in an ad hoc network, for example) has been proposed (see Patent Literature 1, for example).

CITATION LIST

Patent Literature

Patent Literature 1: JP 2009-239385A

SUMMARY OF INVENTION

Technical Problem

According to the above technology of the related art, two wireless communication apparatuses are able to exchange various data with each other by short-range wireless communication, without connecting using a wired link. In addition, on such a network, each wireless communication apparatus is able to communicate with nearby wireless communication apparatuses without depending on a master station such as a control apparatus. Furthermore, on an ad hoc network, if a new wireless communication apparatus appears nearby, the new wireless communication apparatus is also able to freely join the network. For this reason, the network coverage may be increased as nearby wireless communication apparatuses increase.

In addition, besides autonomously interconnecting with nearby wireless communication apparatuses, each wireless communication apparatus is also able to forward information to be exchanged with another wireless communication apparatus in a bucket relay manner (also called a multi-hop relay). Also, a network that conducts multi-hop is typically known as a mesh network.

In this way, on an ad hoc network or a mesh network, it is possible to freely communicate with surrounding wireless communication apparatuses. However, if connections are made with surrounding wireless communication apparatuses to extend the network, the control-related overhead increases, and there is a risk of becoming inefficient.

The present technology has been devised in light of such circumstances, and an objective thereof is to efficiently perform wireless communication among a plurality of wireless communication apparatuses.

Solution to Problem

The present technology has been made to solve the above problems. An embodiment of the present technology is a wireless communication apparatus, a control method thereof, and a program causing a computer to execute the method, the wireless communication apparatus including a communication unit that transmits and receives data in at least one communication mode from among a first communication mode in which wireless communication is conducted with other wireless communication apparatuses present within a predetermined range, and a second communication mode in which wireless communication is conducted with other wireless communication apparatuses present within a wider range than the predetermined range; and a control unit that, when data is being transmitted and received with a second wireless communication apparatus via one or a plurality of other wireless communication apparatuses in the first communication mode, configures the second communication mode and conducts a control for detecting a third wireless communication apparatus that satisfies a predetermined condition. Consequently, when data is being transmitted and received with a second wireless communication apparatus via one or a plurality of other wireless communication apparatuses in the first communication mode, there is realized an action of configuring the second communication mode and conducting a control for detecting a third wireless communication apparatus that satisfies a predetermined condition.

In the above embodiment, if the third wireless communication apparatus is detected, the control unit may conduct a control for connecting to the third wireless communication apparatus instead of the second wireless communication apparatus in the first communication mode, and transmitting and receiving data with the third wireless communication apparatus via one or a plurality of other wireless communication apparatuses. Consequently, if the third wireless communication apparatus is detected, there is realized an action of connecting to the third wireless communication apparatus instead of the second wireless communication apparatus in the first communication mode, and transmitting and receiving data with the third wireless communication apparatus via one or a plurality of other wireless communication apparatuses.

In the above embodiment, in the first communication mode, the communication unit may transmit and receive data with the second wireless communication apparatus to receive a first service provided by the second wireless communication apparatus, and in the second communication mode, the control unit may detect, as the third wireless communication apparatus, a wireless communication apparatus that provides the same service as the first service. Consequently, in the first communication mode, there is realized an action of transmitting and receiving data with the second wireless communication apparatus to receive a first service provided by the second wireless communication apparatus, and in the second communication mode, there is realized an action of detecting, as the third wireless communication apparatus, a wireless communication apparatus that provides the same service as the first service.

In the above embodiment, in the first communication mode, the communication unit may transmit and receive data with the second wireless communication apparatus to receive the first service, and may also transmit and receive data with a fourth wireless communication apparatus to receive a second service provided by the fourth wireless communication apparatus via one or a plurality of other wireless communication apparatuses, and the control unit may detect, as the third wireless communication apparatus, a wireless communication apparatus whose communication route is at least partially shared in common with a communication route for transmitting and receiving data with the fourth wireless communication apparatus in the first communication mode. Consequently, in the first communication mode, there is realized an action of transmitting and receiving data with the second wireless communication apparatus to receive the first service, and also transmitting and receiving data with a fourth wireless communication apparatus to receive a second service provided by the fourth wireless communication apparatus via one or a plurality of other wireless communication apparatuses. Also, there is realized an action of detecting, as the third wireless communication apparatus, a wireless communication apparatus whose communication route is at least partially shared in common with a communication route for transmitting and receiving data with the fourth wireless communication apparatus in the first communication mode.

In the above embodiment, the control unit may configure the second communication mode to detect the third wireless communication apparatus at a predetermined timing. Consequently, there is realized an action of configuring the second communication mode and detecting the third wireless communication apparatus at a predetermined timing.

In the above embodiment, the control unit may configure the second communication mode on the basis of a configured value of a timer. Consequently, there is realized an action of configuring the second communication mode on the basis of a configured value of a timer.

In the above embodiment, the control unit may configure the second communication mode on the basis of a communication status in the first communication mode. Consequently, there is realized an action of configuring the second communication mode on the basis of a communication status in the first communication mode.

In the above embodiment, the control unit may configure the second communication mode on the basis of a remaining level of a battery for driving another wireless communication apparatus present on a communication route in the first communication mode. Consequently, there is realized an action of configuring the second communication mode on the basis of a remaining level of a battery for driving another wireless communication apparatus present on a communication route in the first communication mode.

In the above embodiment, the control unit may configure the second communication mode on the basis of a movement status of another wireless communication apparatus present on a communication route in the first communication mode. Consequently, there is realized an action of configuring the second communication mode on the basis of a movement status of another wireless communication apparatus present on a communication route in the first communication mode.

Another embodiment of the present technology is a communication system, a control method thereof, and a program causing a computer to execute the method, the communication system including first to third wireless communication apparatuses that transmit and receive data in at least one communication mode from among a first communication mode in which wireless communication is conducted with other wireless communication apparatuses present within a predetermined range, and a second communication mode in which wireless communication is conducted with other wireless communication apparatuses present within a wider range than the predetermined range. The first wireless communication apparatus, when data is being transmitted and received with the second wireless communication apparatus via one or a plurality of other wireless communication apparatuses in the first communication mode, configures the second communication mode and conducts a control for detecting the third wireless communication apparatus that satisfies a predetermined condition. Consequently, when data is being transmitted and received with the second wireless communication apparatus via one or a plurality of other wireless communication apparatuses in the first communication mode, there is realized an action of configuring the second communication mode and detecting the third wireless communication apparatus that satisfies a predetermined condition.

Advantageous Effects of Invention

According to the present technology, the advantageous effect of being able to efficiently perform wireless communication among a plurality of wireless communication apparatuses may be achieved.

BRIEF DESCRIPTION OF DRAWINGS

FIG. 3 is a diagram illustrating a relationship between respective communication modes conducted by a first modem 221 and a second modem 222 according to a first embodiment of the present technology.

FIG. 5 is a diagram illustrating an example format of a beacon transmitted by each wireless communication apparatus constituting a communication system 100 according to the first embodiment of the present technology.

FIG. 6 is a diagram illustrating an example format of a beacon transmitted by each wireless communication apparatus constituting a communication system 100 according to the first embodiment of the present technology.

FIG. 8 is a sequence flowchart illustrating an exemplary communication process among apparatuses constituting a communication system 100 according to a first embodiment of the present technology.

FIG. 9 is a diagram illustrating an example of the connection state in a case in which a first wireless communication apparatus 200 according to a first embodiment of the present technology receives a plurality of services from a plurality of wireless communication apparatuses.

FIG. 10 is a diagram illustrating an example transition of a display screen displayed on a display unit 290 according to a first embodiment of the present technology.

FIG. 11 is a diagram illustrating an example of the connection state in a case in which a first wireless communication apparatus 200 according to a first embodiment of the present technology receives a plurality of services from a plurality of wireless communication apparatuses.

DESCRIPTION OF EMBODIMENTS

Hereinafter, embodiments for carrying out the present technology (hereinafter designated the embodiments) will be described. The description will proceed in the following order.

1. First embodiment (communication control: example of configuring second communication mode and detecting optimal wireless communication apparatus during execution of first communication mode)

1. First Embodiment

[Exemplary Configuration of Communication System]

Figure 1:
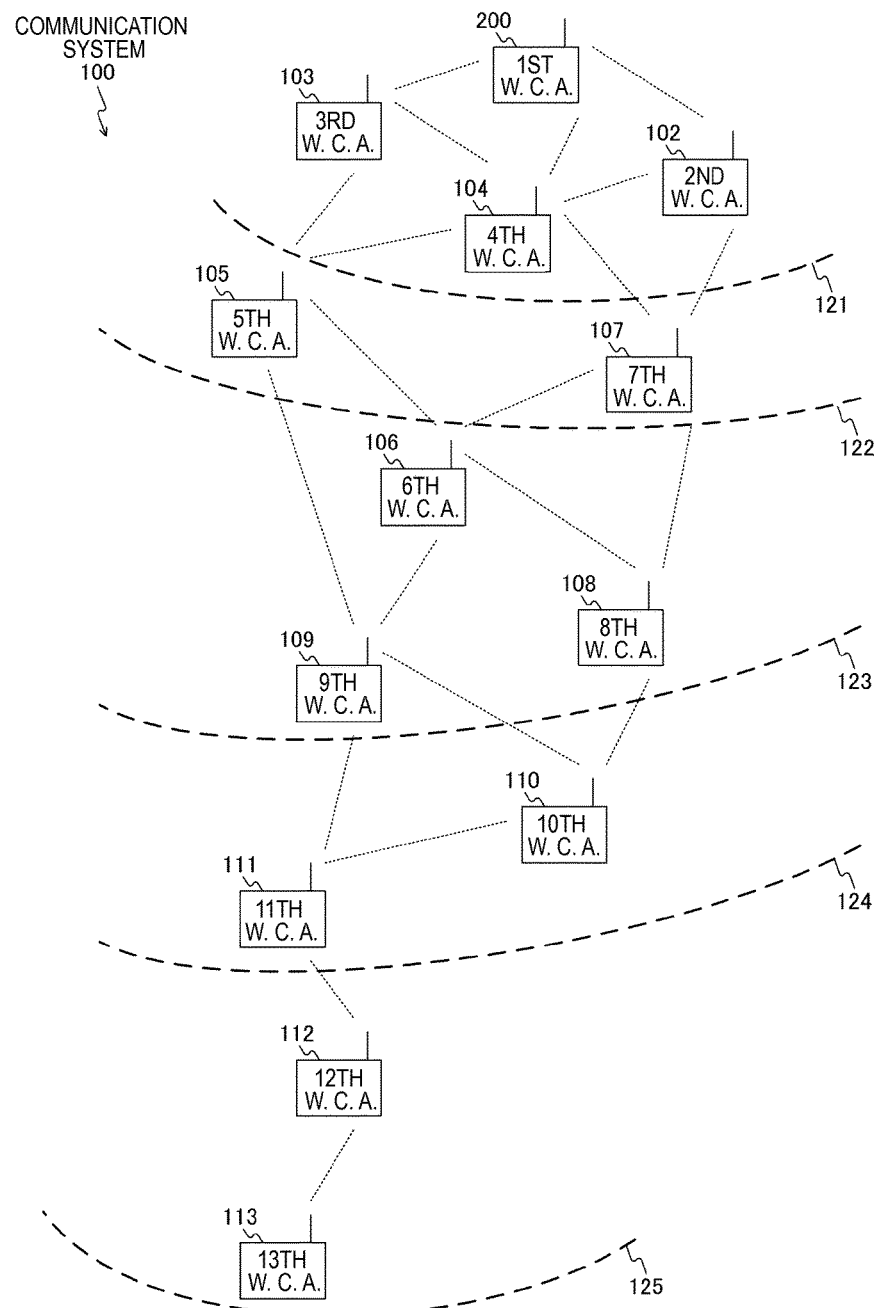
FIG. 1 is a diagram that illustrates an exemplary system configuration of a communication system 100 according to a first embodiment of the present technology.

FIG. 1 is a diagram that illustrates an exemplary system configuration of a communication system 100 according to a first embodiment of the present technology. Note that in some of the drawings, wireless communication apparatuses are each abbreviated as "W. C. A." for convenience.

The communication system 100 is equipped with a plurality of wireless communication apparatuses (first wireless communication apparatus 200, second wireless communication apparatus 102, third wireless communication apparatus 103, and so on to a 13th wireless communication apparatus 113). Each wireless communication apparatus (device) constituting the communication system 100 is, for example, a portable information processing apparatus (such as a smartphone, mobile phone, or tablet, for example), or a stationary information processing apparatus (such as a printer or personal computer, for example).

Herein, ad hoc communication, ad hoc networks, and the like are known as communication methods in which nearby wireless communication apparatuses autonomously interconnect. On such a network, each wireless communication apparatus is able to communicate with nearby wireless communication apparatuses without depending on a master station (for example, a control apparatus). Accordingly, an embodiment of the present technology will be described by taking an ad hoc network as an example of a communication method in which nearby wireless communication apparatuses autonomously interconnect.

On an ad hoc network, if a new wireless communication apparatus is added nearby, the new wireless communication apparatus is also able to freely join the network. For example, suppose a case in which, at first, only the first wireless communication apparatus 200, the second wireless communication apparatus 102, the third wireless communication apparatus 103, and so on to the eighth wireless communication apparatus 108 have joined the ad hoc network from among the wireless communication apparatuses illustrated in FIG. 1. In this case, suppose that the ninth wireless communication apparatus 109 to the 13th wireless communication apparatus 113 are successively added. In this case, the network coverage may be increased as these wireless communication apparatuses (nearby wireless communication apparatuses) increase. In other words, the network coverage may be increased as the ninth wireless communication apparatus 109 to the 13th wireless communication apparatus 113 are successively added.

Herein, besides autonomously interconnecting with nearby wireless communication apparatuses, each wireless communication apparatus is also able to forward information to be exchanged with another wireless communication apparatus in a bucket relay manner.

For example, suppose that the first wireless communication apparatus 200 is able to communicate directly with each of the second wireless communication apparatus 102 to the fourth wireless communication apparatus 104, but is unable to communicate directly with the other wireless communication apparatuses because of factors such as limited radio range. In FIG. 1, the range over which the first wireless communication apparatus 200 may communicate directly (the transmission range based on the first wireless communication apparatus 200) is indicated as a transmission range 121. Note that the transmission range 121 corresponds to the transmission range in the case of limiting the forwarding (hop) count to one time.

Even when direct communication is unavailable in this way, a wireless communication apparatus capable of communicating directly with the first wireless communication apparatus 200 (the second wireless communication apparatus 102 to the fourth wireless communication apparatus 104) is able to forward data from the first wireless communication apparatus 200 to another wireless communication apparatus. Accordingly, by forwarding data in this way, it becomes possible for the first wireless communication apparatus 200 and a wireless communication apparatus that is unable to communicate directly with the first wireless communication apparatus 200 to exchange information with each other. For example, it becomes possible for the first wireless communication apparatus 200 and the fifth wireless communication apparatus 105 that is unable to communicate directly with the first wireless communication apparatus 200 to exchange information with each other via the third wireless communication apparatus 103 (or the fourth wireless communication apparatus 104).

A method that conducts mutual data forwarding (also called a bucket relay) in this way and delivers information to distance wireless communication apparatuses is designated a multi-hop relay. Also, a network that conducts multi-hop is typically known as a mesh network.

Figure 2:
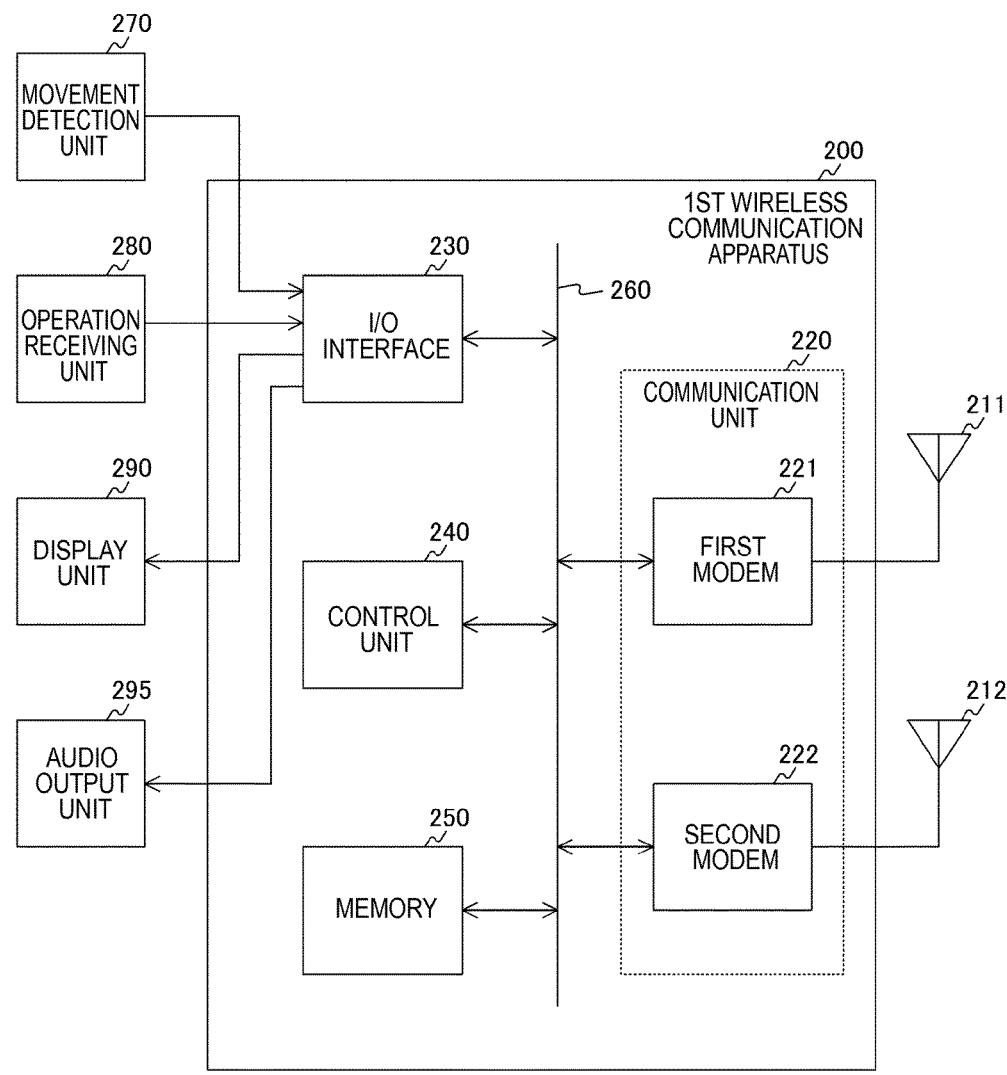
FIG. 2 is a block diagram illustrating an exemplary internal configuration of a first wireless communication apparatus 200 according to a first embodiment of the present technology.

FIG. 2 illustrates a configuration of a wireless communication apparatus constituting such an ad hoc network or mesh network.

Note that in FIG. 1, based on the first wireless communication apparatus 200, the transmission range limited to a forwarding (hop) count of two times is labeled the transmission range 122, while the transmission range limited to a forwarding (hop) count of three times is labeled the transmission range 123. Similarly, the transmission range limited to a forwarding (hop) count of four times is labeled the transmission range 124.

[Exemplary Configuration of Wireless Communication Apparatus]

FIG. 2 is a block diagram illustrating an exemplary internal configuration of a first wireless communication apparatus 200 according to a first embodiment of the present technology. Note that since the internal configuration of other wireless communication apparatuses is the same as the first wireless communication apparatus 200, herein, only the first wireless communication apparatus 200 will be described, and description of the other wireless communication apparatuses will be omitted.

The first wireless communication apparatus 200 is equipped with antennas 211 and 212, a communication unit 220, an input/output (I/O) interface 230, a control unit 240, and memory 250. In addition, these components are connected via a bus 260.

The communication unit 220 is equipped with a first modem 221 and a second modem 222. The first modem 221 is a module for transmitting and receiving radio waves via the antenna 211. Also, the second modem 222 is a module for transmitting and receiving radio waves via the antenna 212. Note that the relationship between respective communication modes conducted by the first modem 221 and the second modem 222 will be described in detail with reference to FIG. 3.

[Communication Mode Examples]

FIG. 3 is a diagram illustrating a relationship between respective communication modes conducted by a first modem 221 and a second modem 222 according to a first embodiment of the present technology.

As discussed above, the first wireless communication apparatus 200 is equipped with a plurality of modems (the first modem 221 and the second modem 222), and each modem (the first modem 221 and the second modem 222) conducts wireless communication in a different communication mode.

For example, the first modem 221 transmits and receives data in a first communication mode that conducts wireless communication with another wireless communication apparatus present within a predetermined range. For example, in the first communication mode, wireless communication is conducted by radio waves (electromagnetic waves) using a high carrier frequency. Herein, suppose that the predetermined range is a range based on the position of the first wireless communication apparatus 200, for example, and means a range in which the first modem 221 is able to transmit and receive data in the first communication mode. In addition, suppose that another wireless communication apparatus present within the predetermined range is a wireless communication apparatus present near the first wireless communication apparatus 200, for example, and is a wireless communication apparatus that is able to transmit and receive data with the first wireless communication apparatus 200 in the first communication mode.

As another example, the second modem 222 transmits and receives data in a second communication mode that conducts wireless communication with another wireless communication apparatus present within a wider range than the predetermined range. For example, in the second communication mode, wireless communication is conducted by radio waves using a lower carrier frequency than the carrier frequency used in the first communication mode.

In other words, the first communication mode and the second communication mode are communication modes with physically different signal transmission ranges. For example, the second communication mode is a communication mode that is able to transmit signals over a wider range than the first communication mode.

FIG. 3 illustrates an exemplary relationship between a first communication mode 225 and a second communication mode 226. For example, the first communication mode may be a communication mode that uses ultra-wideband (UWB), while the second communication mode may be a communication mode that uses a 2.4 GHz wireless local area network (LAN). As another example, the first communication mode may be a communication mode that uses near field communication (NFC), while the second communication mode may be a communication mode that uses a 2.4 GHz wireless local area network (LAN).

In this way, the communication unit 220 transmits and receives data in at least one communication mode from among a first communication mode and a second communication mode.

Note that each of the first communication mode and the second communication mode may also be wireless communication using radio waves (electromagnetic waves), or at least one may be wireless communication using a medium other than radio waves. For example, the first communication mode may be wireless communication conducted using a magnetic field, while the second communication mode may be wireless communication conducted using radio waves.

Additionally, although the present embodiment of the present technology illustrates an example of realizing wireless communication in a plurality of communication modes by installing a plurality of onboard modems, wireless communication in a plurality of communication modes may also be realized by installing a single onboard modem. For example, wireless communication in a plurality of communication modes may be realized by modifying the operating parameters (such as the transmission power and the reception sensitivity, for example) of a single modem.

[Exemplary Configuration of Wireless Communication Apparatus]

The I/O interface 230 illustrated in FIG. 2 is an interface with external apparatus such as sensors and actuators that operate in conjunction with the first wireless communication apparatus 200. FIG. 2 illustrates an example in which a movement detection unit 270, an operation receiving unit 280, a display unit 290, and an audio output unit 295, for example, are connected to the I/O interface 230 as external apparatus. Also, although FIG. 2 illustrates an example of providing the movement detection unit 270, the operation receiving unit 280, the display unit 290, and the audio output unit 295 externally to the first wireless communication apparatus 200, some or all of these may also be built into the first wireless communication apparatus 200.

The movement detection unit 270 detects movement of the first wireless communication apparatus 200 by detecting properties such as the acceleration, motion, and orientation of the first wireless communication apparatus 200, and outputs movement information related to the detected movement to the control unit 240 via the I/O interface 230. For the movement detection unit 270, an acceleration sensor, a gyro sensor, and a Global Positioning System (GPS) receiver may be used, for example. For example, the movement detection unit 270 may use position information detected using GPS (for example, latitude and longitude) to compute the movement distance of the first wireless communication apparatus 200 (for example, the movement distance per unit time).

The operation receiving unit 280 is an operation receiving unit that receives operating input performed by a user, and outputs operating information corresponding to received operating input to the control unit 240 via the I/O interface 230. The operation receiving unit 280 is realized with a touch panel, keyboard, or mouse, for example.

The display unit 290 is a display unit that displays various information (for example, the display screen 300 illustrated in FIG. 7, or the display screens 310 and 320 illustrated in FIG. 10) on the basis of control by the control unit 240. Note that for the display unit 290, a display panel such as an organic electroluminescence (EL) panel or a liquid crystal display (LCD) panel may be used, for example. Note that the operation receiving unit 280 and the display unit 290 may also be integrated by using a touch panel that enables a user to perform operating input by bringing a finger in contact with or in proximity to a display screen.

The audio output unit 295 is an audio output unit (for example, a speaker) that outputs various audio on the basis of control by the control unit 240.

The controller 240 controls the operation of each component of first wireless communication apparatus 200 on the basis of a control program stored in the memory 250. For example, the control unit 240 conducts signal processing on transmitted and received information. Also, the control unit 240 is realized by a central processing unit (CPU). For example, when data is transmitted and received with respect to another wireless communication apparatus in the first communication mode, the control unit 240 configures the second communication mode and conducts a control for detecting a new wireless communication apparatus that satisfies a predetermined condition.

The memory 250 is memory that stores various information (for example, a control program) required for the first wireless communication apparatus 200 to perform desired operation. In addition, the memory 250 stores various content, such as music content and image content (for example, motion image content and still image content). Additionally, various content stored in the memory 250 may be provided to another wireless communication apparatus using wireless communication.

For example, when transmitting data using wireless communication, the control unit 240 processes information read our from the memory 250, a signal input from the I/O interface 230, or the like, and generates a chunk of data (transmission packet) to actually transmit. Subsequently, the control unit 240 outputs the generated transmission packet to a modem (the first modem 221 or the second modem 222). Also, the modem (the first modem 221 or the second modem 222), after converting the transmission packet into the format of a communication scheme for actual transmission and the like, externally transmits the converted transmission packet from an antenna (the antenna 211 or the antenna 212).

As another example, when receiving data using wireless communication, a modem (the first modem 221 or the second modem 222) extracts a received packet by having a receiver built into each modem perform signal processing on a radio signal received via an antenna (the antenna 211 or 212). Subsequently, the control unit 240 interprets the extracted and received packet. If, as a result of the interpretation, the extracted and received packet is judged to be data that should be stored, the control unit 240 writes the data to the memory 250. On the other hand, if the extracted and received packet is judged to be data that should be forwarded to another wireless communication apparatus, the control unit 240 outputs the data to a modem (the first modem 221) as a transmission packet to be forwarded to another wireless communication apparatus. Also, if the extracted and received packet is judged to be data that should be forwarded to an external actuator, the control unit 240 externally outputs the data from the I/O interface 230 (for example, to the display unit 290).

Herein, as discussed earlier, the first communication mode and the second communication mode have different signal transmission ranges. Also, as illustrated in FIG. 1, suppose a case in which a first wireless communication apparatus 200 and a second wireless communication apparatus 102 to a 13th wireless communication apparatus 113, for a total of 13 wireless communication apparatuses, are interspersed. In addition, suppose that the control unit 240 is able to modify a limitation rule for the forwarding count of a multi-hop relay in a mesh network, depending on the communication mode to use.

Herein, as an example, suppose a case in which a limitation of one time is configured as the limitation rule for the forwarding count when using the first communication mode, whereas a limitation rule is not configured for the forwarding count when using the second communication mode. In other words, suppose that in the first communication mode, wireless communication is possible up to the transmission range 121 illustrated in FIG. 1, whereas in the second communication mode, wireless communication is possible up to the transmission range 125 illustrated in FIG. 1.

In this case, when conducting wireless communication in the first communication mode, the first wireless communication apparatus 200 is able to exchange signals directly with the nearby second wireless communication apparatus 102 to the fourth wireless communication apparatus 104. However, when conducting wireless communication in the first communication mode, the first wireless communication apparatus 200 is unable to exchange signals directly with other wireless communication apparatuses that are not nearby wireless communication apparatuses (the second wireless communication apparatus 102 to the fourth wireless communication apparatus 104). On the other hand, when conducting wireless communication in the second communication mode, the first wireless communication apparatus 200 is also able to exchange signals directly with the distant 13th wireless communication apparatus 113.

Herein, if the first communication mode is used, low-power communication is possible, and in addition, since signal interference is not exerted over a long distance, communication resources may be utilized efficiently and effectively. However, since more multi-hop relays are required to acquire the overall state of a plurality of wireless communication apparatuses, a loss of efficiency is also anticipated in some cases. In addition, when the forwarding count is limited, in the first communication mode, information related to a distance wireless communication apparatus may not be acquired in some cases.

Meanwhile, if the second communication mode is used, power consumption increases and signal interference extends over a wide range, thereby enabling communication with distant wireless communication apparatuses, and the overall state of a plurality of wireless communication apparatuses may be acquired easily. However, although the transmission of wideband signals is possible in the first communication mode, in the second communication mode, only narrowband signals that are narrower than the first communication mode may be transmitted in many cases.

[Example Transmission of Service Discovery Information]

Figure 4:
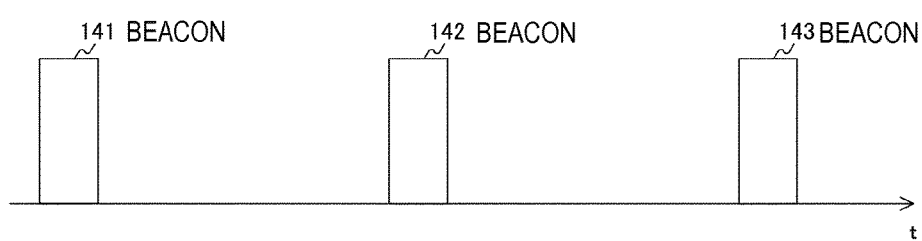
FIG. 4 is a diagram illustrating a transmission example in a case in which each wireless communication apparatus constituting a communication system 100 according to the first embodiment of the present technology transmits service discovery information.

FIG. 4 is a diagram illustrating a transmission example in a case in which each wireless communication apparatus constituting a communication system 100 according to the first embodiment of the present technology transmits service discovery information.

FIG. 4 illustrates an example of periodically (or non-periodically) transmitting a beacon (beacon signal) including service discovery information. Also, FIG. 4 illustrates an example of beacon transmission with the horizontal axis representing the time axis. In other words, FIG. 4 diagrammatically illustrates beacons 141 to 143 successively transmitted in a time series.

Herein, service discovery information is information that is used when discovering a service that another wireless communication apparatus is able to provide, and is the local apparatus service information 157 and the other apparatus service information 158 illustrated in FIG. 5, for example.

In this way, each wireless communication apparatus constituting the communication system 100 periodically (or non-periodically) announces service discovery information (included in a beacon) to surrounding wireless communication apparatuses. Note that an exemplary configuration of a beacon will be described in detail with reference to FIG. 5.

[Example Format of Service Discovery Information]

FIGS. 5 and 6 are diagrams illustrating an example format of a beacon transmitted by each wireless communication apparatus constituting a communication system 100 according to the first embodiment of the present technology. Note that FIG. 5a illustrates an example format of local apparatus service information 157 included in beacon information 153, while FIG. 5b illustrates an example format of other apparatus service information 158 included in beacon information 153. Also, FIG. 6 illustrates example content of a service announcement field included in the local apparatus service information 157 and the other apparatus service information 158.

The beacon 150 includes a preamble 151, a header 152, and beacon information 153.

The preamble 151 is information indicating the existence of a packet (beacon). In other words, each wireless communication apparatus constituting the communication system 100 is able to detect the existence of a beacon by receiving the preamble 151.

The header 152 is placed in a predetermined position of the packet, and stores information related to the packet (beacon) itself. For example, the header 152 stores information such as the source, destination, and size of the packet (information related to the packet (beacon) itself). In other words, each wireless communication apparatus constituting the communication system 100 decodes and analyzes the header. As a result of this analysis, each wireless communication apparatus constituting the communication system 100 is able to detect which wireless communication apparatus transmitted a signal addressed to which wireless communication apparatus, and also the signal type of the signal (such as whether or not the signal is a beacon).

The beacon information 153 is information to announce to each wireless communication apparatus constituting the communication system 100. In other words, each wireless communication apparatus constituting the communication system 100 includes information that should be announced to other wireless communication apparatuses in the beacon for transmission.

Next, the beacon information 153 will be described in detail.

The beacon information 153 includes time information 154, a network ID 155, a network attribute 156, local apparatus service information 157, other apparatus service information 158, and other information 159.

The time information 154 is time information indicating the time at which the beacon that includes the information was transmitted from the source wireless communication apparatus.

The network ID 155 is information indicating an ID of the network constituted by the source wireless communication apparatus.

The network attribute 156 is information indicating an attribute of the network constituted by the source wireless communication apparatus.

The local apparatus service information 157 is information related to a service provided by the source wireless communication apparatus (local apparatus service information).

The other apparatus service information 158 is information related to a service provided by a wireless communication apparatus present near the source wireless communication apparatus (other apparatus service information). Herein, the local apparatus service information 157 and the other apparatus service information 158 corresponds to the service discovery information.

The other information 159 is information other than the above information.

Next, the local apparatus service information 157 and the other apparatus service information 158 will be described.

As illustrated in FIG. 5a, the local apparatus service information 157 is made up of information fields, namely an element ID 160, a length 161, and service announcement fields [0] to [N] 162.

The element ID 160 is an element ID indicating that local apparatus service information is stored.

The length 161 is a length indicating the length of the local apparatus service information element.

The service announcement fields [0] to [N] 162 are made up of one or a plurality of (for example, N) service announcement fields. One service announcement field is placed for each service provided by the corresponding wireless communication apparatus. For example, three fields are placed for a wireless communication apparatus that provides three services.

The service announcement fields [0] to [N] 162 store a service type 163, a content ID 164, a content attribute 165, ranking information 166, a cache recommendation 167, a clone degree 168, and redistribution information 169. Note that each piece of information will be described in detail with reference to FIG. 6.

As illustrated in FIG. 5b, the other apparatus service information 158 is made up of information fields, namely an element ID 170, a length 171, wireless communication apparatus IDs [0] to [M] 172, and service announcement fields [0] to [M] 173.

Note that the other apparatus service information 158 stores information that is basically similar to the local apparatus service information 157, but differs by additionally storing the wireless communication apparatus IDs [0] to [M] 172. In other words, the element ID 170 and the length 171 correspond to the element ID 160 and the length 161 illustrated in FIG. 5a. In addition, the wireless communication apparatus IDs [0] to [M] 172 and the service announcement fields [0] to [M] 173 are placed in pairs for each service provided by a wireless communication apparatus.

The wireless communication apparatus IDs [0] to [M] 172 are an ID for identifying a corresponding wireless communication apparatus (for example, a nearby wireless communication apparatus). In other words, the wireless communication apparatus IDs [0] to [M] 172 are information indicating which wireless communication apparatus provides the service of the paired service announcement field.

The service announcement fields [0] to [M] 173 are made up of one or a plurality of (for example, M) service announcement fields. Note that the service announcement fields [0] to [M] 173 are similar to the service announcement fields [0] to [N] 162 illustrated in FIG. 5a, except that information related to another wireless communication apparatus (a wireless communication apparatus other than the wireless communication apparatus that transmits the beacon) is stored.

In other words, the combinations of the wireless communication apparatus IDs [0] to [M] 172 and the service announcement fields [0] to [M] 173 (that is, M combinations) are equal to the number of services that should be reported to the wireless communication apparatus that transmits the beacon.

Next, the service announcement field will be described with reference to FIG. 6.

The service type 163 is information for identifying the details of a service (such as content delivery). In addition, the service type 163 may also include a count indicating how many more times the service discovery information may be forwarded. By including the count, it is possible to prevent the service discovery information related to a service from being forwarded a number of times exceeding the count. Also, a wireless communication apparatus that receives the service discovery information may also decide, on the basis of the information in the service type 163, whether or not to receive a service identified by the service type 163.

The content ID 164 is an ID for identifying a service. A wireless communication apparatus that transmits or receives the service discovery information manages the receiving of a service identified by the content ID 164 on the basis of the information of the content ID 164, and generates fee information as required.

The content attribute 165 is information that indicates the bit capacity required to provide the service, a group able to receive the service, an authentication method required to receive the service, and the like. Herein, the group able to receive the service may be, for example, friends (that is, the wireless communication apparatuses possessed by the friends) of the user who possesses the wireless communication apparatus that provides the service. In this case, an authentication method for identifying a friend may be used to judge whether or not a wireless communication apparatus belongs in the group. In addition, a wireless communication apparatus that receives service discovery information may also decide, on the basis of the information in the content attribute 165, whether or not to receive the corresponding service, or whether or not the corresponding service is receivable.

The ranking information 166 is information that indicates whether the frequency of access to the service (content) is high or low. A wireless communication apparatus that transmits service discovery information may decide, on the basis of the information in the ranking information 166, whether or not to announce the service discovery information to the next wireless communication apparatus, or how frequently to announce the service discovery information. A wireless communication apparatus that receives the service discovery information may decide, on the basis of the information in the ranking information 166, whether or not to cache the received content. For example, it is preferable to configure the ranking information 166 so that high-ranking services are announced and received.

The cache recommendation 167 is information that indicates a recommendation of how much the service should be cached for neighboring wireless communication apparatuses (a recommended degree). A wireless communication apparatus that transmits service discovery information configures a setting that raises the recommended degree in the case of judging that the service is accessed frequently and the service should be provided to other wireless communication apparatuses. Also, a wireless communication apparatus that receives the service discovery information may decide, on the basis of the information in the cache recommendation 167, whether or not to receive and cache content.

The clone degree 168 is information that indicates how many times a service (content) has been copied from the original, or alternatively, how many more times copying is allowed. A wireless communication apparatus that receives the service discovery information is controlled to be unable to store a copy equal to or greater than a count determined by the clone degree 168.

The redistribution information 169 is information that indicates whether or not a wireless communication apparatus that receives the service discovery information may cache and redistribute a service (content). In a wireless communication apparatus that receives the service discovery information, the need to cache and redistribute a service (content) is controlled on the basis of the information in the redistribution information 169.

For example, if the first wireless communication apparatus 200 illustrated in FIG. 1 broadcasts a beacon, the beacon is received by the surrounding wireless communication apparatuses (the second wireless communication apparatus 102 to the fourth wireless communication apparatus 104). Subsequently, the second wireless communication apparatus 102 to the fourth wireless communication apparatus 104 are able to detect, on the basis of the header of the received beacon, that the beacon is a beacon transmitted from the first wireless communication apparatus 200. Also, by checking the details of the beacon information 153 included in the received beacon, the second wireless communication apparatus 102 to the fourth wireless communication apparatus 104 are able to ascertain a service that the first wireless communication apparatus 200 is able to provide and the like.

For example, suppose a case in which the beacon 150 transmitted from the first wireless communication apparatus 200 is received by the second wireless communication apparatus 102 to the fourth wireless communication apparatus 104. In this case, the second wireless communication apparatus 102 to the fourth wireless communication apparatus 104 are able to detect, on the basis of the network attribute 156 included in the received beacon, that the source first wireless communication apparatus 200 exists as part of a network nearby. In addition, attributes of the network are identified by the network attribute 156.

In addition, the second wireless communication apparatus 102 to the fourth wireless communication apparatus 104 are able to acquire, on the basis of the service announcement fields 162 included in the received beacon 150, information related to various services receivable via the first wireless communication apparatus 200.

Also, if the second wireless communication apparatus 102 to the fourth wireless communication apparatus 104 receive service discovery information from the first wireless communication apparatus 200, each apparatus itself operates as a relay node in a multi-hop relay. Consequently, the second wireless communication apparatus 102 to the fourth wireless communication apparatus 104 are able to inform relay destinations of the services that the first wireless communication apparatus 200 is able to provide. In other words, service discovery information transmitted by the second wireless communication apparatus 102 and the fourth wireless communication apparatus 104 (local apparatus service information 157 and other apparatus service information 158) partially includes services that are provided from the first wireless communication apparatus 200. Note that the information including services provided from the first wireless communication apparatus 200 is the other apparatus service information 158.

By repeatedly transmitting and receiving service discovery information in this way, it becomes possible to provide service discovery information about the first wireless communication apparatus 200 to every corner of the network. In other words, by including service discovery information in a periodically transmitted beacon, each wireless communication apparatus is able to announce providable services to nearby wireless communication apparatuses. In addition, by receiving beacons, each wireless communication apparatus is able to discover wireless communication apparatuses present nearby, and at the same time also detect which services are being provided by the discovered wireless communication apparatuses.

Meanwhile, by limiting the packet forwarding count as discussed above, it is possible to limit the communication peers able that the first wireless communication apparatus 200 may connect to. In this way, by limiting the forwarding count, the range over which to transmit service discovery information about the first wireless communication apparatus 200 may be adjusted. Consequently, overhead may be decreased.

[Example Display Screen for Selecting Service]

Figure 7:
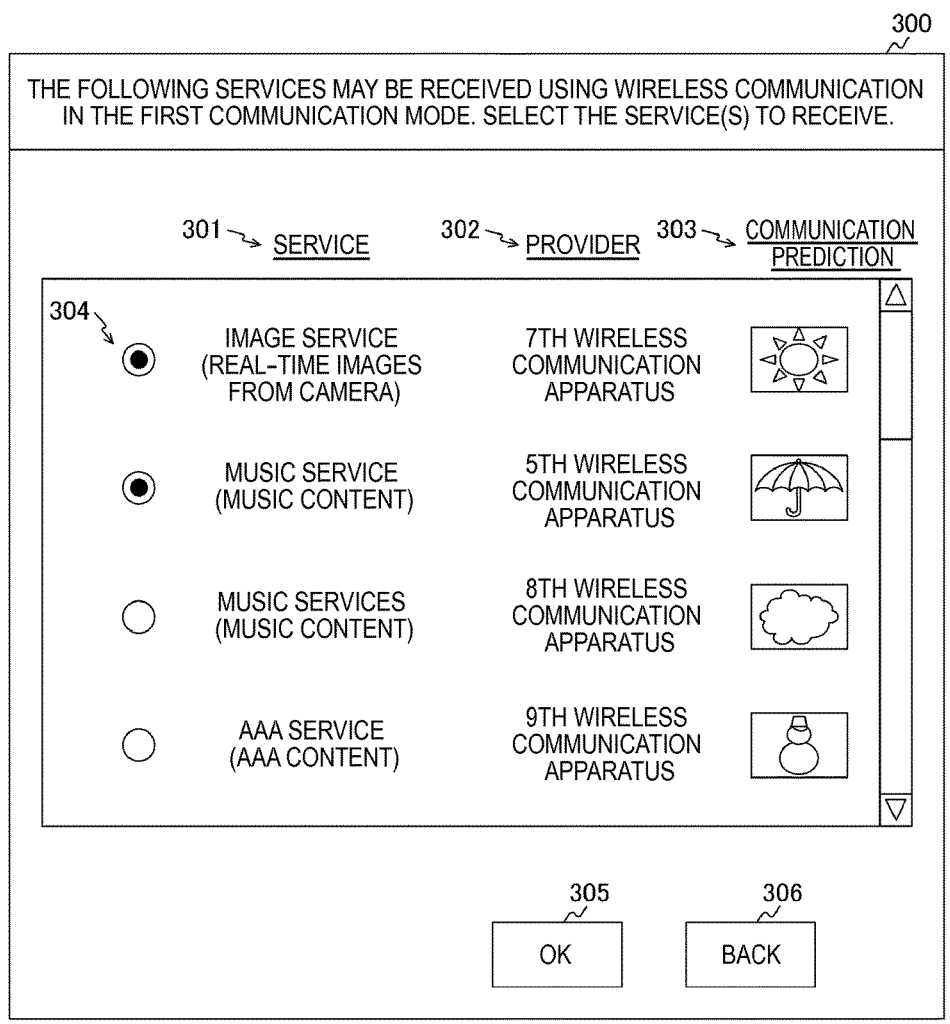
FIG. 7 is a diagram illustrating an example of a display screen (display screen 300) displayed on a display unit 290 according to a first embodiment of the present technology.

FIG. 7 is a diagram illustrating an example of a display screen (display screen 300) displayed on a display unit 290 according to a first embodiment of the present technology.

The display screen 300 is a display screen by which a user selects a desired service. In addition, the display screen 300 is displayed on the basis of service discovery information (the local apparatus service information 157 and the other apparatus service information 158 illustrated in FIG. 5) that is transmitted from each wireless communication apparatus constituting the communication system 100.

On the display screen 300, a service 301, a provider 302, a communication prediction 303, and a radio button 304 are displayed for each service. Also displayed on the display screen 300 are an OK button 305 and a Back button 306.

The service 301 displays a service that the first wireless communication apparatus 200 is able to receive. The service is displayed on the basis of the service discovery information (the service type 163 illustrated in FIG. 5), for example.

The provider 302 is a name expressing the wireless communication apparatus that provides the corresponding service. The name is displayed on the basis of the service discovery information (the header 152 illustrated in FIG. 5 in the case of a neighboring wireless communication apparatus, and the wireless communication apparatus ID 172 illustrated in FIG. 5 in the case of any other wireless communication apparatus), for example.

The communication prediction 303 is an indicator expressing predicted communication conditions after accepting the corresponding service. The indicator is displayed on the basis of factors such as the degree of congestion and the number of wireless communication apparatuses present on a communication route identified using the service discovery information, for example.

The radio button 304 is a radio button attached to each service, and when selected by a user operation, a black circle appears inside the white circle. FIG. 7 illustrates a state in which an image service provided by the seventh wireless communication apparatus 107 and a music service (audio service) provided by the fifth wireless communication apparatus 105 have been selected.

The OK button 305 is a button pressed when confirming a service selected by a user operation.

The Back button 306 is a button pressed when going back to the previously displayed display screen.

[Example of Communication in First Communication Mode]

FIG. 8 is a sequence flowchart illustrating an exemplary communication process among apparatuses constituting a communication system 100 according to a first embodiment of the present technology. Note that this example is a simplified illustration of the communication process in a case of the first wireless communication apparatus 200 receiving a service provided by the seventh wireless communication apparatus 107 by wireless communication in the first communication mode.

First, the seventh wireless communication apparatus 107 transmits service discovery information to each wireless communication apparatus (including the first wireless communication apparatus 200) (401 to 404). In this case, since the seventh wireless communication apparatus 107 is unable to exchange information directly with the first wireless communication apparatus 200, the service discovery information is transmitted via the fourth wireless communication apparatus 104. Also, the service discovery information is included in a beacon and periodically or non-periodically transmitted as illustrated in FIGS. 4 to 6, for example.

In the case of receiving the service discovery information (404), the first wireless communication apparatus 200 displays on the display unit 290 information related to services that the first wireless communication apparatus 200 is able to receive, on the basis of the received service discovery information (405). In addition, respective information corresponding to service discovery information received from other wireless communication apparatuses within a fixed period of time is also displayed. For example, the display screen 300 illustrated in FIG. 7 is displayed.

Next, the user performs a selection operation to select a desired service on the display screen being displayed on the display unit 290 (406). For example, on the display screen 300 illustrated in FIG. 8, a selection operation for selecting an image service (for example, an operation of pressing the OK button 305 after checking the radio button 304) is performed.

When a selection operation is performed on the display screen being displayed on the display unit 290 (406), the control unit 240 transmits a service request for requesting the service corresponding to the selection operation to the wireless communication apparatus corresponding to the selection operation (407 to 410). For example, suppose a case in which a selection operation for selecting the image service is performed on the display screen 300 illustrated in FIG. 7 (406). In this case, an image service request for requesting the image service corresponding to the selection operation is transmitted to the seventh wireless communication apparatus 107 corresponding to the selection operation (407 to 410). In this case, since the seventh wireless communication apparatus 107 is unable to exchange information directly with the first wireless communication apparatus 200, the image service request is transmitted via the fourth wireless communication apparatus 104.

When the image service request is received (410), the seventh wireless communication apparatus 107 provides the image service corresponding to the received image service request to the first wireless communication apparatus 200 (411 to 414). For example, if the image service is a service that provides images (real-time images) captured by a camera built into or attached to the seventh wireless communication apparatus 107, the real-time images are successively transmitted via the fourth wireless communication apparatus 104 (411 to 414).

Note that in FIG. 8 illustrates an example of a user selecting a desired service on a display screen that is displayed on the basis of service discovery information received from another wireless communication apparatus. However, the user may also selected a desired service in advance before receiving service discovery information. For example, a display screen with the provider 302 and the communication prediction 303 removed from the display screen 300 illustrated in FIG. 7 may be displayed, and on this display screen, the user may select a desired service (for example, an image service). In this case, when service discovery information is received from a wireless communication apparatus capable of providing the service selected by the user, a request for the selected service may be automatically issued to that wireless communication apparatus.

Also although FIG. 8 illustrates an example of selecting and receiving a single service, it is also possible to select a plurality of services, and receive the plurality of services from one or a plurality of wireless communication apparatuses. This example is illustrated in FIG. 9.

[Example of Receiving Plurality of Services]

FIG. 9 is a diagram illustrating an example of the connection state in a case in which a first wireless communication apparatus 200 according to a first embodiment of the present technology receives a plurality of services from a plurality of wireless communication apparatuses. Note that the system configuration illustrated in FIG. 9 is similar to FIG. 1.

Herein, suppose a case in which each of the fifth wireless communication apparatus 105 and the eighth wireless communication apparatus 108 is capable of providing a music service, while the seventh wireless communication apparatus 107 is capable of providing an image service.

Note that the image service is, for example, a service that uses wireless communication to provide images (real-time images) captured by a camera built into or attached to the seventh wireless communication apparatus 107. In addition, the image service may also be a service that uses wireless communication to provide image content being stored in the seventh wireless communication apparatus 107, for example.

In addition, suppose a case in which the user of the first wireless communication apparatus 200 desires to receive services to look at images while listening to music.

As discussed earlier, in the communication mode, each wireless communication apparatus constituting the communication system 100 periodically announces the presence of the wireless communication apparatus itself and services providable by the wireless communication apparatus itself. In other words, service discovery information (included in a beacon) for reporting the presence of the wireless communication apparatus itself and services providable by the wireless communication apparatus itself is periodically transmitted. By receiving the service discovery information, when each wireless communication apparatus constituting the communication system 100 communicates with some other wireless communication apparatus from among the neighboring wireless communication apparatuses, it is possible to detect what kinds of services may be received.

Also, as discussed earlier, by having the wireless communication apparatus itself operate as a relay node in a multi-hop relay, the service discovery information may report what kinds of services are providable to a relay destination. In other words, by having each wireless communication apparatus constituting the communication system 100 transmit service discovery information and by having the wireless communication apparatus itself operate as a relay node in a multi-hop relay, it is possible to report what kinds of services are providable to a relay destination.

For example, the fifth wireless communication apparatus 105 transmits, to neighboring wireless communication apparatuses (such as the third wireless communication apparatus 103 and the fourth wireless communication apparatus 104), service discovery information indicating that the fifth wireless communication apparatus 105 itself is able to provide a music service. The third wireless communication apparatus 103 receives this service discovery information, and the third wireless communication apparatus 103 itself acts as a relay node to transmit, to neighboring wireless communication apparatuses (such as the first wireless communication apparatus 200 and the fourth wireless communication apparatus 104), service discovery information indicating that a music service is providable. Also, the seventh wireless communication apparatus 107 and the eighth wireless communication apparatus 108 likewise transmit service discovery information for reporting services providable by each wireless communication apparatus itself.

The first wireless communication apparatus 200, by receiving service discovery information from the third wireless communication apparatus 103, is able to detect that a music service may be received from the fifth wireless communication apparatus 105 via the third wireless communication apparatus 103. Subsequently, the music service may be received from the fifth wireless communication apparatus 105 via the third wireless communication apparatus 103, as indicated by the arrow 131, for example.

Similarly, the first wireless communication apparatus 200, by receiving service discovery information from the fourth wireless communication apparatus 104, is able to detect that an image service may be received from the seventh wireless communication apparatus 107 via the fourth wireless communication apparatus 104. Also, the first wireless communication apparatus 200, by receiving service discovery information from the fourth wireless communication apparatus 104, is able to detect that a music service may be received from the eighth wireless communication apparatus 108 via the fourth wireless communication apparatus 104.

A multi-hop relay used in an embodiment of the present technology will now be described.

As an example, a procedure will be described in which a mesh network is formed as illustrated in FIG. 9, and the first wireless communication apparatus 200 communicates with the fifth wireless communication apparatus 105.

The first wireless communication apparatus 200, before starting communication with the fifth wireless communication apparatus 105, specifies which communication route to use (which wireless communication apparatus to traverse). For example, the first wireless communication apparatus 200 exchanges communication routing information with each neighboring wireless communication apparatus, on the basis of a procedure conforming to an established communication routing protocol.

For example, a procedure determined by the standard of the Optimized Link State Routing Protocol (OLSR) of RFC 3626 published by the IETF may be used. As another example, a procedure determined by a standard such as the IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 10: Mesh Networking (commonly known as IEEE 802.11s) published by the IEEE may be used.

On the basis of these procedures, the first wireless communication apparatus 200 is able to detect that communication with the fifth wireless communication apparatus 105 is possible by traversing the third wireless communication apparatus 103, without needlessly wasting radio resources. For example, it is possible to detect that communication is possible without needless waste, on the basis of factors such as a small number of relay nodes, minimal transmission delay, and minimal time occupying a frequency channel for transmission.

The information used for the detection is held internally in each wireless communication apparatus as communication route information, and when a packet is actually transmitted or received, the information is referenced to search for which wireless communication apparatus the packet should be transmitted to next in order to make the packet reach the final destination.

In the procedure discussed above, the first wireless communication apparatus 200 acquires communication route information that is valid up to the fifth wireless communication apparatus 105. Subsequently, on the basis of the acquired communication route information, the first wireless communication apparatus 200 transmits a packet addressed to the fifth wireless communication apparatus 105 to the third wireless communication apparatus 103. The third wireless communication apparatus 103 receives the packet, and on the basis of internally held communication route information, forwards the received packet addressed to the fifth wireless communication apparatus 105 to the fifth wireless communication apparatus 105.

Note that the creation of the above communication route information is also conducted with respect to all wireless communication apparatuses connected to the mesh network in some cases. However, in some cases, such as when there is an extremely large number of wireless communication apparatuses present on the network, the overhead related to the creation of communication route information increases due to factors such as control packets. Accordingly, to reduce the overhead related to the creation of communication route information due to factors such as control packets, a limit on the number of times that each packet is forwarded may be imposed as discussed earlier, for example.

At this point, suppose that in the example illustrated in FIG. 9, a music service is received from the fifth wireless communication apparatus 105 via the third wireless communication apparatus 103, as indicated by the arrow 131. In addition, suppose that an image service is received from the seventh wireless communication apparatus 107 via the fourth wireless communication apparatus 104, as indicated by the arrow 132.

Herein, in order for the first wireless communication apparatus 200 to receive the services provided by the fifth wireless communication apparatus 105 and the seventh wireless communication apparatus 107 as illustrated in FIG. 9, the wireless communication apparatuses need to continuously exchange control signals. In other words, the wireless communication apparatuses (the first wireless communication apparatus 200, the third wireless communication apparatus 103 to the fifth wireless communication apparatus 105, and the seventh wireless communication apparatus 107) need to continuously exchange control signals for establishing and maintaining communication connections in the first communication mode.

However, if many wireless communication apparatuses are participating in the network, a large number of such control signals needs to be transmitted and received, thereby increasing overhead. In this case, a reduction is often achievable by blocking communication routes that do not contribute to the actual service provision, for example.

Accordingly, the first embodiment of the present technology illustrates an example of utilizing wireless communication in the second communication mode to optimize the communication route used to provide a service. For example, in the case of receiving a plurality of services, an example of prioritizing service providers sharing a communication route in common while treating all other connections as disconnection candidates will be illustrated.

[Example Display when Conducting Optimization Process]

FIG. 10 is a diagram illustrating an example transition of a display screen displayed on a display unit 290 according to a first embodiment of the present technology.

FIG. 10a illustrates a display screen 310 that is displayed when an interrupt process (optimization process) is activated by a trigger for detecting an optimal communication route (a second communication mode activation trigger).

Note that in the case of using Long Term Evolution (LTE) or 3rd Generation (3G) as the second communication mode, communication charges occur when conducting wireless communication in the second communication mode. When communication charges occur in the case of conducting wireless communication in the second communication mode in this way, an indication may be added and displayed on the display screen 310. For example, the message "A communication charge of 10 yen/min will apply." may be added and displayed on the display screen 310.

As illustrated in FIG. 9, suppose that the first wireless communication apparatus 200 uses wireless communication in the first communication mode to receive services from other wireless communication apparatuses (for example, the fifth wireless communication apparatus 105 and the seventh wireless communication apparatus 107). In addition, the control unit 240 of the first wireless communication apparatus 200 configures the second communication mode at a predetermined timing, and uses the second communication mode to optimize the communication route used to provide the services.

The timing at which to conduct the communication route optimization using wireless communication in the second communication mode will now be described. The timing is the case when an interrupt occurs due to a second communication mode activation trigger, and a connection in the second communication mode is attempted in this case only.

For example, a timer may be used to cause the interrupt due to the second communication mode activation trigger to occur. For example, suppose that the control unit 240 of the first wireless communication apparatus 200 holds a timer. Subsequently, while the first wireless communication apparatus 200 is being provided with services by using communication mode in the first communication mode, the control unit 240 sets the timer to activate the second communication mode. When the timer ends, the second communication mode activation trigger occurs.

The second communication mode activation cycle (that is, the configured value of the timer) will now be described. For example, the second communication mode activation cycle may be modified according to the number of other wireless communication apparatuses present near the first wireless communication apparatus 200 (for example, within a predetermined range based on the first wireless communication apparatus 200). For example, a longer second communication mode activation cycle may be configured if the number of other wireless communication apparatuses present near by the first wireless communication apparatus 200 is small with reference to a threshold value. On the other hand, a shorter second communication mode activation cycle may be configured if the number of other wireless communication apparatuses present near by the first wireless communication apparatus 200 is large with reference to a threshold value. Herein, the number of other wireless communication apparatuses present nearby may be detected on the basis of service discovery information received by the first wireless communication apparatus 200, for example.

In this way, the control unit 240 of the first wireless communication apparatus 200 may configure the second communication mode on the basis of the configured value of the timer.

In addition, the interrupt due to the second communication mode activation trigger may also be made to occur on the basis of the amount of overhead. For example, the control unit 240 of the first wireless communication apparatus 200 monitors the amount of overhead of control signals being exchanged in the first communication mode. Subsequently, the control unit 240 may modify the second communication mode activation cycle according to the amount of overhead of control signals for maintaining the network in the first communication mode. For example, activation of the second communication mode may be started if the amount of overhead becomes large with reference to a threshold value.

In addition, the interrupt due to the second communication mode activation trigger may also be made to occur on the basis of the link conditions of links connected using the first communication mode. For example, activation of the second communication mode may be triggered when the link status is degraded. Additionally, the following specific examples (1) to (3) are also anticipated as an example.

(1) The control unit 240 of the first wireless communication apparatus 200 monitors the occupancy ratio in the first communication mode (such as the ratio of time that the channel is occupied). Subsequently, if the control unit 240 judges that the communication capacity in the first communication mode is strained due to link congestion or the like, and that continued provision of the desired service is unsustainable (or is in danger of becoming unsustainable), the control unit 240 generates the second communication mode activation trigger.

(2) Suppose that any of the relay apparatus (the wireless communication apparatus that relays the services) and the service providing apparatus (the wireless communication apparatus that provides the service) is a battery-driven wireless communication apparatus. In this case, as the battery level decreases, there is a possibility that the service currently being provided will become unsustainable. Accordingly, a wireless communication apparatus that may possibly become unable to provide the service reports the possibility that the wireless communication apparatus itself may be unable to sustain the service to wireless communication apparatuses present nearby. Such information may be forwarded by multi-hop relay, and the wireless communication apparatus that is receiving the service is able to acquire such information. For example, such information may be included in the service discovery information, for example. Subsequently, after receiving such information, the wireless communication apparatus that is receiving the service generates the second communication mode activation trigger.

(3) Suppose that any of the relay apparatus and the service providing apparatus is a highly portable wireless communication (for example, mobile equipment or handheld wireless communication apparatus). In this case, if the wireless communication apparatus moves location, there is a possibility that the communication route currently being used may become invalid. Accordingly, a wireless communication apparatus that may possibly become unable to provide the service as a result of the wireless communication apparatus moving location reports the possibility that the wireless communication apparatus itself may be unable to sustain the service to wireless communication apparatuses present nearby. Note that movement of a wireless communication apparatus (for example, movement equal to or greater than a threshold value) may be detected by a movement detection unit (corresponding to the movement detection unit 270 illustrated in FIG. 2). Such information is forwarded by multi-hop relay, and the wireless communication apparatus that is receiving the service is able to acquire such information. For example, such information may be included in the service discovery information, for example. Subsequently, after receiving such information, the wireless communication apparatus that is receiving the service generates the second communication mode activation trigger.

In this way, the control unit 240 of the first wireless communication apparatus 200 may configure the second communication mode on the basis of the status of communication in the first communication mode. In addition, the control unit 240 of the first wireless communication apparatus 200 may configure the second communication mode on the basis of the remaining level of a battery for driving another wireless communication apparatus present on a communication route in the first communication mode. In addition, the control unit 240 of the first wireless communication apparatus 200 configures the second communication mode on the basis of the movement status of another wireless communication apparatus present on a communication route in the first communication mode.

Note that the second communication mode activation trigger may also be generated when a predetermined operation is conducted by the user (for example, an example of not selecting or deselecting a service).

[Example of Wireless Communication in Second Communication Mode]

Next, an example of wireless communication in the second communication mode will be described.

In this example, suppose that the first wireless communication apparatus 200 is in the state of receiving services as illustrated in FIG. 9 (that is, a state of receiving a music service from the fifth wireless communication apparatus 105 and receiving an image service from the seventh wireless communication apparatus 107).

In this case, a connection in the second communication mode is started due to the second communication mode activation trigger. In the second communication mode, the control unit 240 of the first wireless communication apparatus 200 uses the second communication mode to broadcast details of the services that the first wireless communication apparatus 200 itself is receiving currently. The state of receiving a music service from the fifth wireless communication apparatus 105 and receiving an image service from the seventh wireless communication apparatus 107 is announced as the service details. In addition, the control unit 240 announces the communication route from the provider of each service. In addition, when making the announcement, if other wireless communication apparatuses providing the same service exist, the control unit 240 requests a reply.

The eighth wireless communication apparatus 108 receives the signal, and detects that the eighth wireless communication apparatus 108 itself is able to provide the same service as the service being provided by the fifth wireless communication apparatus 105 (music service).

At this point, suppose that the eighth wireless communication apparatus 108 is configured to provide services to other wireless communication apparatuses. In this case, the eighth wireless communication apparatus 108 replies to the first wireless communication apparatus 200, indicating that the eighth wireless communication apparatus 108 itself is able to provide a service (the music service), and indicating that the eighth wireless communication apparatus 108 itself is adjacent to the seventh wireless communication apparatus 107 in the first communication mode.

After receiving the reply from the eighth wireless communication apparatus 108, the control unit 240 of the first wireless communication apparatus 200 recognizes that a desired service (the music service) may be provided by the eighth wireless communication apparatus 108.

At this point, if the first wireless communication apparatus 200 is receiving a plurality of services as illustrated in FIG. 9, service providers sharing a communication route in common may be prioritized, while all other connections may be treated as disconnection candidates. For example, the first wireless communication apparatus 200 is receiving an image service provided by the seventh wireless communication apparatus 107 via the fourth wireless communication apparatus 104. For this reason, the control unit 240 of the first wireless communication apparatus 200 may judge that the music service is better received from the eighth wireless communication apparatus 108 via the fourth wireless communication apparatus 104 and the seventh wireless communication apparatus 107.

Additionally, in the case of receiving the music service from the eighth wireless communication apparatus 108 in this way, the control unit 240 of the first wireless communication apparatus 200 judges that it is better to block the connection with the third wireless communication apparatus 103 and the fifth wireless communication apparatus 105. For this reason, the control unit 240 of the first wireless communication apparatus 200 extracts the third wireless communication apparatus 103 and the fifth wireless communication apparatus 105 as disconnection candidates.

As another example, if a communication route from a service provider traverses a large number of wireless communication apparatuses, a new communication route that results in the minimum distance may be extracted.

According to these judgments, the control unit 240 of the first wireless communication apparatus 200 establishes a connection with the eighth wireless communication apparatus 108 using the first communication mode via the first modem 221. Next, the first wireless communication apparatus 200 transitions to a service reception state in which the music service is received from the eighth wireless communication apparatus 108 via the fourth wireless communication apparatus 104 and the seventh wireless communication apparatus 107. Next, the control unit 240 of the first wireless communication apparatus 200 disconnects from the third wireless communication apparatus 103 and the fifth wireless communication apparatus 105 using the first communication mode.

FIG. 11 illustrates the organized state of connections in the first communication mode in this way, in which connection links in the first communication mode that are not needed to provide a service are disconnected.

[Example of Receiving Plurality of Services]

FIG. 11 is a diagram illustrating an example of the connection state in a case in which a first wireless communication apparatus 200 according to a first embodiment of the present technology receives a plurality of services from a plurality of wireless communication apparatuses. Note that the system configuration illustrated in FIG. 11 is similar to FIG. 1.

By disconnecting unneeded connection links in this way, the overhead of control signals in the first communication mode required to maintain the network may be reduced.

[Example Display After Conducting Optimization Process]

FIG. 10b illustrates a display screen 320 that is displayed when a service provider or communication route is changed as a result of an optimization process for changing to an optimal provider and communication route.

The display screen 320 is a display screen that is displayed after conducting the optimization process. A service 321, a provider 322, a communication prediction 323, and an OK button 324 are displayed.

The service 321 displays the service that has been optimized. Note that the service 301 corresponds to the service 301 illustrated in FIG. 7.

The provider 322 is a name expressing the wireless communication apparatus that provided the service before the optimization process was conducted, and the wireless communication apparatus that provides the service after the optimization process was conducted. Note that the provider 322 corresponds to the provider 302 illustrated in FIG. 7.

The communication prediction 323 is an indicator expressing the predicted communication conditions for the service before the optimization process was conducted, and the predicted communication conditions for the service after the optimization process was conducted. Note that the communication prediction 323 corresponds to the communication prediction 303 illustrated in FIG. 7.

The OK button 324 is a button pressed after confirming the details on the display screen 320.

[Example Operation of Wireless Communication Apparatus]

Figure 12:
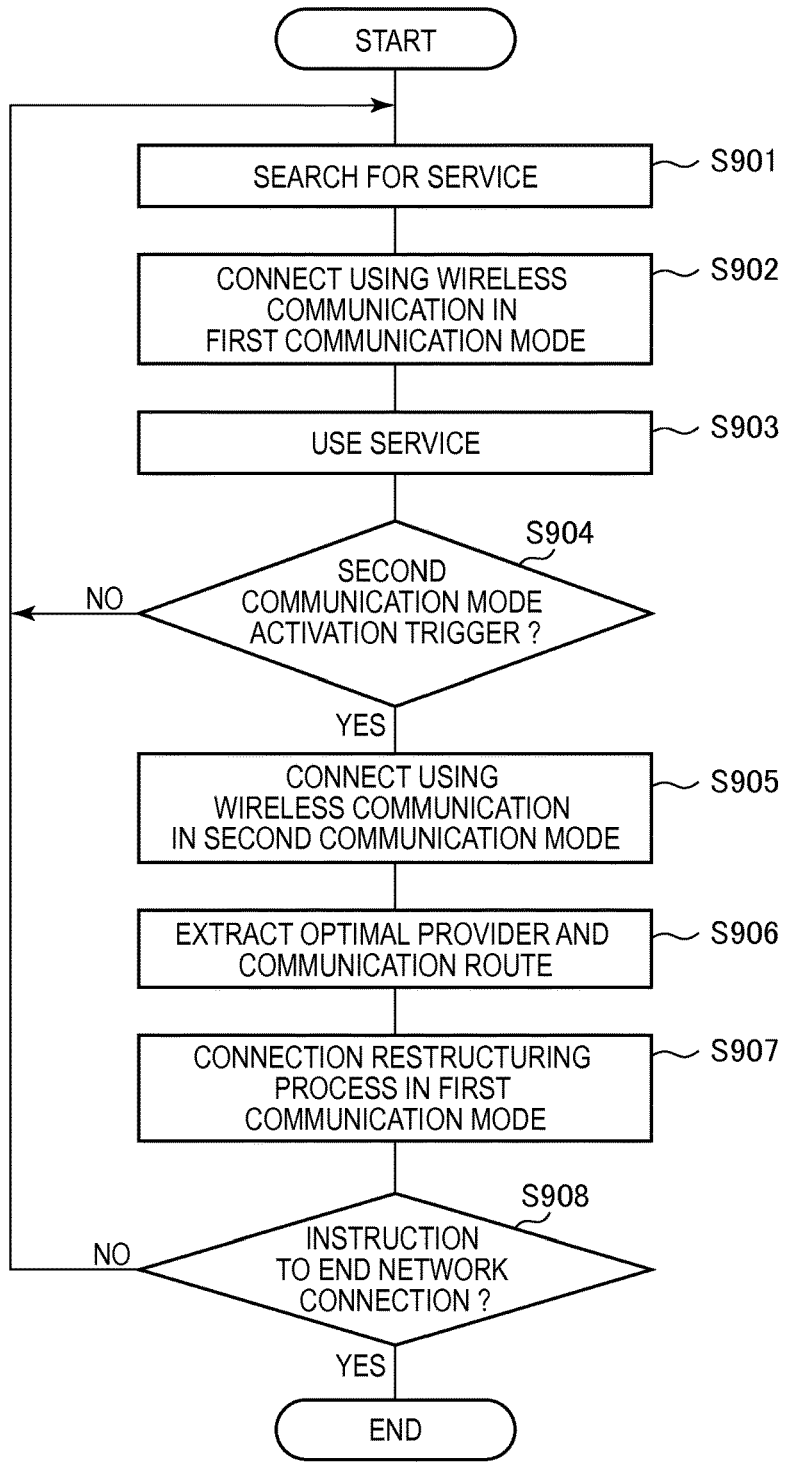
FIG. 12 is a flowchart illustrating an exemplary processing sequence of a communication control process of a first wireless communication apparatus 200 according to a first embodiment of the present technology.

FIG. 12 is a flowchart illustrating an exemplary processing sequence of a communication control process of a first wireless communication apparatus 200 according to a first embodiment of the present technology. FIG. 12 illustrates an example for a case in which the user has selected desired services in advance.

First, each wireless communication apparatus constituting the communication system 100 uses wireless communication in the first communication mode to transmit service discovery information. For this reason, the control unit 240 receives the service discovery information from each wireless communication apparatus, and on the basis of the service discovery information, searches for a service that is providable from among the services selected by the user (step S901). With the search, the first wireless communication apparatus 200 is able to detect a service that was selected by the user.

For example, in the example illustrated in FIG. 9, the first wireless communication apparatus 200 detects that an image service may be received from the seventh wireless communication apparatus 107 via the fourth wireless communication apparatus 104, and also detects that a music service may be received from the fifth wireless communication apparatus 105 via the third wireless communication apparatus 103.

In this way, when a service that was selected by the user is detected, the control unit 240 starts communication in an attempt to establish a connection with each wireless communication apparatus that provides a detected service (step S902).

Subsequently, after a communication route is established, the first wireless communication apparatus 200 starts the reception of the service (step S903). For example, the control unit 240 causes the display unit 290 to display an image corresponding to the image service received from the seventh wireless communication apparatus 107 via the fourth wireless communication apparatus 104 (step S903).

As another example, the control unit 240 causes the audio output unit 295 to output music corresponding to the music service received from the fifth wireless communication apparatus 105 via the third wireless communication apparatus 103 (step S903).

Next, the control unit 240 judges whether or not an interrupt process has been activated due to the second communication mode activation trigger (step S904). Subsequently, if the interrupt process has not been activated, the process returns to step S901. On the other hand, if the interrupt process has been activated (step S903), the optimization process is started.

The optimization process is carried out by using wireless communication in the second communication mode to exchange information with wireless communication apparatuses present nearby.

For example, the control unit 240 uses wireless communication in the second communication mode to exchange information with wireless communication apparatuses present nearby (for example, all wireless communication apparatuses illustrated in FIG. 9) (step S905). Subsequently, the control unit 240 conducts the optimization process to check whether or not the providers and communication routes currently being used to receive the image service and the music service are optimal (step S906). The optimization process checks whether or not there exists a provider and a communication route able to provide even more efficiently the same service as a service currently being received (step S906).

For example, in the example illustrated in FIG. 9, suppose that the optimization process discovers that the eighth wireless communication apparatus 108 is able to provide a music service similar to the fifth wireless communication apparatus 105. At this point, as discussed earlier, if the first wireless communication apparatus 200 is receiving a plurality of services, it is preferable to prioritize service providers sharing a communication route in common, while treating all other connections as disconnection candidates. Accordingly, when the eighth wireless communication apparatus 108 is discovered as a music service provider, the control unit 240 may judge that the music service is better received from the eighth wireless communication apparatus 108 via the fourth wireless communication apparatus 104 and the seventh wireless communication apparatus 107.

Additionally, in the case of receiving the music service from the eighth wireless communication apparatus 108 in this way, the control unit 240 judges that it is better to block the connection with the third wireless communication apparatus 103 and the fifth wireless communication apparatus 105. For this reason, the control unit 240 extracts the third wireless communication apparatus 103 and the fifth wireless communication apparatus 105 as disconnection candidates (step S906). Note that step S905 is an example of a first step described in the claims. Meanwhile, step S906 is an example of a second step described in the claims.

On the basis of these judgments, the control unit 240 establishes a connection with the eighth wireless communication apparatus 108 using the first communication mode via the first modem 221 (step S907). Next, the first wireless communication apparatus 200 transitions to a service reception state in which the music service is received from the eighth wireless communication apparatus 108 via the fourth wireless communication apparatus 104 and the seventh wireless communication apparatus 107 (step S907). Subsequently, the control unit 240 disconnects from the third wireless communication apparatus 103 and the fifth wireless communication apparatus 105 using the first communication mode (step S907).

Next, the control unit 240 judges whether or not an instruction to end the network connection has been given (step S908), and if an instruction to end the network connection has not been given, the process returns to step S901. On the other hand, if an instruction to end the network connection has been given (step S908), the operation of the communication control process ends.

In this way, the control unit 240 configures the second communication mode while transmitting and receiving data with the fifth wireless communication apparatus 105 and the seventh wireless communication apparatus 107 in the first communication mode via one or a plurality of other wireless communication apparatuses. Subsequently, the control unit 240 detects an eighth wireless communication apparatus 108 that satisfies a predetermined condition in the second communication mode. In this case, in the second communication mode, the control unit 240 detects an eighth wireless communication apparatus 108 that provides the same service as the service provided by the fifth wireless communication apparatus 105. Also, the control unit 240 detects an eighth wireless communication apparatus 108 whose communication route is at least partially shared in common with the communication route for transmitting and receiving data to and from the seventh wireless communication apparatus 107 in the first communication mode.

In addition, when the eighth wireless communication apparatus 108 is detected, the control unit 240 connects to the eighth wireless communication apparatus 108 instead of the fifth wireless communication apparatus 105 in the first communication mode. After this connection, the control unit 240 transmits and receives data with the eighth wireless communication apparatus 108 via one or a plurality of other wireless communication apparatuses.

In this way, the first wireless communication apparatus 200 periodically (or non-periodically) repeats the respective processes of searching for and receiving a service using wireless communication in the first communication mode, and restructuring the connection using wireless communication in the second communication mode. Additionally, a provider and communication route for receiving an optimal service with the minimum necessary resources are extracted.

[Example of Treating Two Communication Modes with Modified Forwarding Count Limits as the First Communication Mode and Second Communication Mode]

The foregoing illustrates an example of treating two communication modes with physically different signal transmission ranges as the first communication mode and the second communication mode. However, it is also conceivable to treat two communication modes with different signal transmission ranges due to modification of the forwarding count limit of a multi-hop relay in a mesh network as the first communication mode and the second communication mode. For example, by modifying the forwarding count limit of a multi-hop relay in a mesh network for a communication mode with the same physical signal transmission range, a first communication mode and a second communication mode may be configured.

Accordingly, the following describes an example of treating a communication mode with a forwarding count limit of 2 hops as the first communication mode, and treating a communication mode with a forwarding count limit of 3 hops or more as the second communication mode.

For example, suppose a case in which the first wireless communication apparatus 200 is receiving services by using wireless communication in the first communication mode, as illustrated in FIG. 9. As discussed earlier, since the forwarding (hop) count is limited to 2 hops in the first communication mode, the wireless communication apparatuses that the first wireless communication apparatus 200 is able to communicate with are limited, even if a multi-hop relay is used. In other words, if only wireless communication in the first communication mode is used, the first wireless communication apparatus 200 is unable to acquire service discovery information from wireless communication apparatuses more distant than the fifth wireless communication apparatus 105 and the seventh wireless communication apparatus 107.

Accordingly, when conducting the optimization process, the first wireless communication apparatus 200 starts a connection using wireless communication in the second communication mode (corresponding to step S905 illustrated in FIG. 12). by making a connection using wireless communication in the second communication mode in this way, the first wireless communication apparatus 200 is able to acquire service discovery information from wireless communication apparatuses present in a range exceeding the forwarding (hop) count limit in the first communication mode.

Specifically, the first wireless communication apparatus 200 reports that the first wireless communication apparatus 200 itself is receiving services to the fifth wireless communication apparatus 105 and the seventh wireless communication apparatus 107 currently providing the services. The state of receiving a music service from the fifth wireless communication apparatus 105 and receiving an image service from the seventh wireless communication apparatus 107 is announced as the details. As a result of this report, a query is made about whether or not another wireless communication apparatus providing the same service is present near each of wireless communication apparatuses (that is, the service provider and relay apparatus (the second wireless communication apparatus 102 to the fifth wireless communication apparatus 105, and the seventh wireless communication apparatus 107)).

For example, after receiving the query, the seventh wireless communication apparatus 107 detects that the eighth wireless communication apparatus 108 which neighbors the seventh wireless communication apparatus 107 itself is providing the same music service, and thus replies back to the first wireless communication apparatus 200 with this information. From the reply, the first wireless communication apparatus 200 recognizes that a service may be received from the eighth wireless communication apparatus 108 (corresponding to step S906 illustrated in FIG. 12).

[Example of Using Past Connection Information]

The foregoing illustrates an example of using wireless communication in the second communication mode to detect an optimal service provider and communication route. At this point, when receiving a service similar to a service provided in the past, it is also conceivable to use the service provider and communication route from when that service was provided.

For example, after receiving a service, the control unit 240 of the first wireless communication apparatus 200 stores which wireless communication apparatus provided the service this time in the memory 250. Subsequently, when receiving the same service next time, the control unit 240 of the first wireless communication apparatus 200 first attempts to receive the service from the wireless communication apparatus stored in the memory 250. For example, in the example illustrated in FIG. 11, the first wireless communication apparatus 200 receives a service from the seventh wireless communication apparatus 107 and the eighth wireless communication apparatus 108. For this reason, at the timing at which the service ends, information related to the seventh wireless communication apparatus 107 and the eighth wireless communication apparatus 108 (past connection information (for example, information for specifying a service provider and communication route)) is stored in the memory 250. Subsequently, when receiving the same service next time, the control unit 240 of the first wireless communication apparatus 200 first attempts to receive the service from the seventh wireless communication apparatus 107 and the eighth wireless communication apparatus 108 stored in the memory 250. According to such a configuration, the overhead related to providing services using wireless communication in the second communication mode may be reduced even further.

In this way, according to an embodiment of the present technology, wireless communication in the first communication mode may be used to receive a provided service with the minimum necessary power consumption and communication resources. In addition, since an optimization process is conducted periodically or non-periodically while receiving a provided service, the control overhead required to maintain a communication connection in the first communication mode may be minimized Consequently, nearby wireless communication apparatuses required to receive the provided service may be utilized efficiently, and an optimal network topology may be realized. In other words, wireless communication may be performed efficiently among a plurality of wireless communication apparatuses.

Additionally, although an embodiment of the present technology illustrates an example of using two communication modes, an embodiment of the present technology may also be applied to the case of using an arbitrary N communication modes (where N is an integer equal to or greater than 3). For example, a first communication mode may be visible light communication, a second communication mode may be 2.4 GHz wireless LAN, and a third communication mode may be LTE. By providing multiple communication modes in this way, wireless communication of wideband signals may be conducted at low cost in the first communication mode, while low-cost wireless communication in the second communication mode may be used to discover an optimal service provider and communication route. Meanwhile, in third communication mode, although a fee is charged, an optimal service provider and communication route may be discovered among an even wider range of wireless communication apparatuses. In this way, a multi-tiered service depending on the user's desires may be provided.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

Additionally, the present technology may also be configured as below.

(1)

A wireless communication apparatus including:

a communication unit that transmits and receives data in at least one communication mode from among a first communication mode in which wireless communication is conducted with other wireless communication apparatuses present within a predetermined range, and a second communication mode in which wireless communication is conducted with other wireless communication apparatuses present within a wider range than the predetermined range; and a control unit that, when data is being transmitted and received with a second wireless communication apparatus via one or a plurality of other wireless communication apparatuses in the first communication mode, configures the second communication mode and conducts a control for detecting a third wireless communication apparatus that satisfies a predetermined condition.

(2)

The wireless communication apparatus according to (2), wherein if the third wireless communication apparatus is detected, the control unit conducts a control for connecting to the third wireless communication apparatus instead of the second wireless communication apparatus in the first communication mode, and transmitting and receiving data with the third wireless communication apparatus via one or a plurality of other wireless communication apparatuses.

(3)

The wireless communication apparatus according to (1) or (2), wherein in the first communication mode, the communication unit transmits and receives data with the second wireless communication apparatus to receive a first service provided by the second wireless communication apparatus, and in the second communication mode, the control unit detects, as the third wireless communication apparatus, a wireless communication apparatus that provides the same service as the first service.

(4)

The wireless communication apparatus according to (3), wherein in the first communication mode, the communication unit transmits and receives data with the second wireless communication apparatus to receive the first service, and also transmits and receives data with a fourth wireless communication apparatus to receive a second service provided by the fourth wireless communication apparatus via one or a plurality of other wireless communication apparatuses, and the control unit detects, as the third wireless communication apparatus, a wireless communication apparatus whose communication route is at least partially shared in common with a communication route for transmitting and receiving data with the fourth wireless communication apparatus in the first communication mode.

(5)

The wireless communication apparatus according to any one of (1) to (4), wherein the control unit configures the second communication mode to detect the third wireless communication apparatus at a predetermined timing.

(6)

The wireless communication apparatus according to (5), wherein the control unit configures the second communication mode on the basis of a configured value of a timer.

(7)

The wireless communication apparatus according to (5), wherein the control unit configures the second communication mode on the basis of a communication status in the first communication mode.

(8)

The wireless communication apparatus according to (5), wherein the control unit configures the second communication mode on the basis of a remaining level of a battery for driving another wireless communication apparatus present on a communication route in the first communication mode.

(9)

The wireless communication apparatus according to (5), wherein the control unit configures the second communication mode on the basis of a movement status of another wireless communication apparatus present on a communication route in the first communication mode.

(10)

A communication system including:

first to third wireless communication apparatuses that transmit and receive data in at least one communication mode from among a first communication mode in which wireless communication is conducted with other wireless communication apparatuses present within a predetermined range, and a second communication mode in which wireless communication is conducted with other wireless communication apparatuses present within a wider range than the predetermined range, wherein the first wireless communication apparatus, when data is being transmitted and received with the second wireless communication apparatus via one or a plurality of other wireless communication apparatuses in the first communication mode, configures the second communication mode and conducts a control for detecting the third wireless communication apparatus that satisfies a predetermined condition.

(11)

A wireless communication apparatus control method including:

a first step of, when data is being transmitted and received with a second wireless communication apparatus via one or a plurality of other wireless communication apparatuses in a first communication mode in which wireless communication is conducted with other wireless communication apparatuses present within a predetermined range, configuring a second communication mode in which wireless communication is conducted with other wireless communication apparatuses present within a wider range than the predetermined range; and a second step of detecting a third wireless communication apparatus that satisfies a predetermined condition in the second communication mode.

(12)

A program causing a computer to execute:

a first step of, when data is being transmitted and received with a second wireless communication apparatus via one or a plurality of other wireless communication apparatuses in a first communication mode in which wireless communication is conducted with other wireless communication apparatuses present within a predetermined range, configuring a second communication mode in which wireless communication is conducted with other wireless communication apparatuses present within a wider range than the predetermined range; and a second step of detecting a third wireless communication apparatus that satisfies a predetermined condition in the second communication mode.

REFERENCE SIGNS LIST 100 communication system
102 second wireless communication apparatus
103 third wireless communication apparatus
104 fourth wireless communication apparatus
105 fifth wireless communication apparatus
106 sixth wireless communication apparatus
107 seventh wireless communication apparatus
108 eighth wireless communication apparatus
109 ninth wireless communication apparatus
110 10th wireless communication apparatus
111 11th wireless communication apparatus
112 12th wireless communication apparatus
113 13th wireless communication apparatus
200 first wireless communication apparatus
211, 212 antenna
220 communication unit
221 first modem
222 second modem
230 I/O interface
240 control unit
250 memory
260 bus
270 movement detection unit
280 operation receiving unit
290 display unit
295 audio output unit

The invention claimed is:

1. A first wireless communication apparatus, comprising:
one or more processors configured to:
transmit and receive first data in at least one of a first communication mode or a second communication mode,
wherein, in the first communication mode, the wireless communication is associated with a first plurality of wireless communication apparatuses within a first range, and
wherein, in the second communication mode, the wireless communication is associated with a second plurality of wireless communication apparatuses within a second range wider than the first range;
receive a plurality of services based on service discovery information,
wherein the plurality of services are transmitted by each of the first plurality of wireless communication apparatuses and the second plurality of wireless communication apparatuses;
select, based on a user input, a service from the plurality of services displayed on a display screen;
receive second data from one of the second plurality of wireless communication apparatuses based on the selected service,
wherein the second data is received in the first communication mode;

configure the second communication mode; and
detect, in the second communication mode, a third wireless communication apparatus based on the reception of the second data from the one of the second plurality of wireless communication apparatuses,
wherein the third wireless communication apparatus satisfies a condition.

2. The first wireless communication apparatus according to claim 1, wherein, in the first communication mode, the one or more processors are further configured to:
connect the first wireless communication apparatus to the third wireless communication apparatus instead of the second wireless communication apparatus; and
transmit and receive third data with the third wireless communication apparatus via the first plurality of wireless communication apparatuses.

3. The first wireless communication apparatus according to claim 1, wherein
in the first communication mode, the one or more processors are further configured to transmit and receive the second data with the second wireless communication apparatus to receive a first service,
wherein the first service is provided by the second wireless communication apparatus; and
wherein the third wireless communication apparatus provides the first service.

4. The first wireless communication apparatus according to claim 3, wherein
in the first communication mode, the one or more processors are further configured to:
transmit and receive the second data with the second wireless communication apparatus to receive the first service;
transmit and receive third data with a fourth wireless communication apparatus to receive a second service,
wherein the second service is provided by the fourth wireless communication apparatus via the first plurality of wireless communication apparatuses; and
detect the third wireless communication apparatus,
wherein, in the first communication mode, a first communication route of the third wireless communication apparatus is at least partially shared in common with a second communication route to transmit and receive the third data with the fourth wireless communication apparatus.

5. The first wireless communication apparatus according to claim 1, wherein the one or more processors are further configured to configure the second communication mode to detect the third wireless communication apparatus at a specific timing.

6. The first wireless communication apparatus according to claim 5, wherein the one or more processors are further configured to configure the second communication mode based on a value of a timer.

7. The first wireless communication apparatus according to claim 5, wherein, in the first communication mode, the one or more processors are further configured to configure the second communication mode based on a communication status of a fourth wireless communication.

8. The first wireless communication apparatus according claim 5, wherein the one or more processors are further configured to configure the second communication mode based on a level of a battery, and wherein the battery drives a fourth wireless communication apparatus on a communication route in the first communication mode.

9. The first wireless communication apparatus according to claim 5, wherein the one or more processors are further configured to configure the second communication mode based on a movement status of a fourth wireless communication apparatus on a communication route in the first communication mode.

10. A communication system, comprising:
three wireless communication apparatuses, each of the three wireless communication apparatuses are configured to:
transmit and receive first data in at least one of a first communication mode or a second communication mode,
wherein, in the first communication mode, the wireless communication is associated with a first plurality of wireless communication apparatuses within a first range,
wherein, in the second communication mode, the wireless communication is associated with a second plurality of wireless communication apparatuses within a second range wider than the first range;
receive a plurality of services based on service discovery information,
wherein the plurality of services are transmitted by each of the first plurality of wireless communication apparatuses and the second plurality of wireless communication apparatuses,
select, based on a user input, a service from the plurality of services displayed on a display screen;
receive second data from one of the second plurality of wireless communication apparatuses based on the selected service,
wherein the second data is received in the first communication mode;
configure the second communication mode; and
detect, in the second communication mode, a third wireless communication apparatus based on the reception of the second data from the one of the second plurality of wireless communication apparatuses,
wherein the third wireless communication apparatus satisfies a condition.

11. A control method, comprising:
in a first wireless communication apparatus:
receiving a plurality of services based on service discovery information,
wherein the plurality of services are transmitted by each of a first plurality of wireless communication apparatuses and a second plurality of wireless communication apparatuses;
selecting, based on a user input, a service from the plurality of services displayed on a display screen;
receiving data from one of the second plurality of wireless communication apparatuses based on the selected service,
wherein the data is received in a first communication mode, and
wherein, in first communication mode, the wireless communication is associated with the first plurality of wireless communication apparatuses within a first range;
configuring a second communication mode,
wherein, in the second communication mode, the wireless communication is conducted with the second plurality of wireless communication apparatuses within a second range wider than the first range; and
detecting, in the second communication mode, a third wireless communication apparatus based on the reception of the data from the one of the second plurality of wireless communication apparatuses,
wherein the third wireless communication apparatus satisfies a condition.

12. A non-transitory computer-readable medium having stored thereon computer-readable instructions, which when executed by a first wireless communication apparatus, cause the first wireless communication apparatus to execute operations, the operations comprising:
receiving a plurality of services based on service discovery information,
wherein the plurality of services are transmitted by each of a first plurality of wireless communication apparatuses and a second plurality of wireless communication apparatuses;
selecting, based on a user input, a service from the plurality of services displayed on a display screen;
receiving data from one of the second plurality of wireless communication apparatuses based on the selected service,
wherein the data is received in a first communication mode, and
wherein, in the first communication mode, wireless communication is associated with the first plurality of wireless communication apparatuses within a first range;
configuring a second communication mode,
wherein, in the second communication mode, the wireless communication is associated with the second plurality of wireless communication apparatuses within a second range wider than the first range; and
detecting, in the second communication mode, a third wireless communication apparatus based on the reception of the data from the one of the second plurality of wireless communication apparatuses,
wherein the third wireless communication apparatus satisfies a condition.

* * * * *